United States Patent
Iwai et al.

(10) Patent No.: US 9,903,030 B2
(45) Date of Patent: *Feb. 27, 2018

(54) HYDROGEN-CONTAINING WATER GENERATING ELECTRODE AND HYDROGEN-CONTAINING WATER GENERATING DEVICE

(71) Applicant: The Chugoku Electric Power Co., Inc., Hiroshima-shi, Hiroshima (JP)

(72) Inventors: Keisou Iwai, Hiroshima (JP);
Masayuki Shimokatu, Hiroshima (JP);
Suehiro Sakai, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/764,779

(22) PCT Filed: Jan. 31, 2014

(86) PCT No.: PCT/JP2014/052353
§ 371 (c)(1),
(2) Date: Jul. 30, 2015

(87) PCT Pub. No.: WO2014/119760
PCT Pub. Date: Aug. 7, 2014

(65) Prior Publication Data
US 2015/0368816 A1    Dec. 24, 2015

(30) Foreign Application Priority Data

Jan. 31, 2013 (JP) ................................ 2013-017959

(51) Int. Cl.
C25B 1/04        (2006.01)
C25B 9/02        (2006.01)
(Continued)

(52) U.S. Cl.
CPC .......... *C25B 11/03* (2013.01); *C02F 1/46109* (2013.01); *C25B 1/04* (2013.01);
(Continued)

(58) Field of Classification Search
CPC ...... C02F 1/4618; C02F 1/46; C02F 1/46109; C02F 2001/46157; C02F 2001/46171;
(Continued)

(56) References Cited

U.S. PATENT DOCUMENTS 5,415,768 A    5/1995 Andelman
5,547,581 A    8/1996 Andelman
(Continued)

FOREIGN PATENT DOCUMENTS

JP       3207427 B2    9/2001
JP    2006-150215 A    6/2006
(Continued)

OTHER PUBLICATIONS

Mar. 11, 2014 International Search Report issued in International Patent Application No. PCT/JP2014/052353.
(Continued)

*Primary Examiner* — Ciel P Thomas
(74) *Attorney, Agent, or Firm* — Oliff PLC

(57) ABSTRACT

According to an aspect, a hydrogen-containing water generating electrode includes: a positive electrode that is a tubular conductor and includes a plurality of openings in a side portion; an insulator that is provided on an outer peripheral portion of the positive electrode and is in contact with the positive electrode; and a negative electrode that is provided on an outer peripheral portion of the insulator, is a tubular conductor in contact with the insulator, and includes a plurality of openings in a side portion.

9 Claims, 24 Drawing Sheets

(51) Int. Cl.
    *C25B 9/04*     (2006.01)
    *C25B 9/06*     (2006.01)
    *C25B 9/08*     (2006.01)
    *C25B 11/03*     (2006.01)
    *C02F 1/461*     (2006.01)

(52) U.S. Cl.
    CPC ............... *C25B 9/02* (2013.01); *C25B 9/04* (2013.01); *C25B 9/06* (2013.01); *C25B 9/08* (2013.01); *C02F 2001/46157* (2013.01); *C02F 2001/46171* (2013.01); *C02F 2201/003* (2013.01); *Y02E 60/366* (2013.01)

(58) Field of Classification Search
    CPC .. C02F 2201/003; C02F 1/46157; C25B 1/04; C25B 9/00; C25B 11/02; C25B 11/03; C25B 9/02; C25B 9/04; C25B 9/06; C25B 9/08; Y02E 60/366
    See application file for complete search history.

(56) References Cited

U.S. PATENT DOCUMENTS

| | | | | |
|---|---|---|---|---|
| 5,688,387 | A * | 11/1997 | Fongen | C02F 1/46109 204/263 |
| 5,748,437 | A | 5/1998 | Andelman | |
| 5,865,966 | A * | 2/1999 | Watanabe | C02F 1/4602 204/278.5 |
| 8,236,147 | B2 | 8/2012 | Field | |
| 2009/0314659 | A1 | 12/2009 | Field | |
| 2011/0180397 | A1* | 7/2011 | Hayakawa | C02F 1/505 204/248 |
| 2012/0247959 | A1* | 10/2012 | Seed | C02F 1/4691 204/554 |

FOREIGN PATENT DOCUMENTS

| | | |
|---|---|---|
| JP | 3143019 U | 7/2008 |
| JP | 2010-088972 A | 4/2010 |
| JP | 2010-088973 A | 4/2010 |
| JP | 2010-284504 A | 12/2010 |
| JP | 4600225 B2 | 12/2010 |
| JP | 2011-525218 A | 9/2011 |
| WO | 95/21674 A1 | 8/1995 |
| WO | 2009/155521 A1 | 12/2009 |
| WO | 2010/023960 A1 | 3/2010 |

OTHER PUBLICATIONS

Jul. 5, 2017 Office Action issued in Korean Patent Application No. 10-2016-7035255.

* cited by examiner

HYDROGEN-CONTAINING WATER GENERATING ELECTRODE AND HYDROGEN-CONTAINING WATER GENERATING DEVICE

FIELD

The present invention relates to a technology to obtain water containing hydrogen from raw water such as tap water.

BACKGROUND

As a technology to generate water containing hydrogen (hydrogen-containing water) from tap water, technologies are described, in which an ion-exchange membrane is provided between a pair of electrodes of a positive electrode and a negative electrode in an electrolytic bath, and hydrogen-containing electrolyzed water is obtained by electrolysis (for example, Patent Literatures 1 to 3).

CITATION LIST

Patent Literature

Patent Literature 1: Japanese Patent Application Laid-Open Publication No. 2010-88972
Patent Literature 2: Japanese Patent Application Laid-Open Publication No. 2010-88973
Patent Literature 3: Japanese Patent Application Laid-Open Publication No. 2010-284504

SUMMARY

Technical Problem

The technologies described in Patent Literatures 1 to 3 are provided with the positive electrode and the negative electrode in the electrolytic bath, and supply raw water to the electrolytic bath to generate hydrogen-containing water. In the technologies described in Patent Literatures 1 to 3, the electrolytic bath is used by being installed in a bath or a tank for storing drinking water. In recent years, a movable portable device that can be brought into a place where the device is used, that is, where the hydrogen-containing water is generated, and generate the hydrogen-containing water is desired in consideration of convenience, instead of the installation type such as the ones described in Patent Literatures 1 to 3. The portable device may be supplied power by a battery or the like, for example, in a case where a commercial power source is not available. Therefore, the portable device is required to cause the raw water to efficiently contain hydrogen.

According to one aspect, an objective of the present invention is to improve efficiency to dissolve hydrogen in the raw water in generating hydrogen-containing water.

Solution to Problem

According to an aspect of the present invention, a hydrogen-containing water generating electrode includes: a positive electrode that is a tubular conductor and includes a plurality of openings in a side portion; an insulator that is provided on an outer peripheral portion of the positive electrode and is in contact with the positive electrode; and a negative electrode that is provided on an outer peripheral portion of the insulator, is a tubular conductor in contact with the insulator, and includes a plurality of openings in a side portion.

According to another aspect of the present invention, the insulator preferably includes a plurality of openings.

According to another aspect of the present invention, the positive electrode and the negative electrode preferably include an end-portion-side opening portion as an opening portion in at least one of end portions.

According to another aspect of the present invention, a size of a gap between the positive electrode and the negative electrode is preferably from 0.1 to 1 mm, both inclusive.

According to another aspect of the present invention, a size of a gap between the positive electrode and the negative electrode is preferably equal to a thickness of the insulator.

According to another aspect of the present invention, the at least a part of the positive electrode and at least a part of the negative electrode preferably have a curved surface.

According to another aspect of the present invention, the positive electrode, the insulator, and the negative electrode preferably have a cylindrical shape.

According to another aspect of the present invention, a hydrogen-containing water generating device includes the hydrogen-containing water generating electrode.

Advantageous Effects of Invention

According to one aspect of the present invention, it is possible to improve efficiency to dissolve hydrogen in raw water in generating hydrogen-containing water.

DESCRIPTION OF EMBODIMENTS

Embodiments for implementing the present invention will be described in detail with reference to the drawings. First, electrodes used for generating hydrogen-containing water will be described.

<Hydrogen-Containing Water Generating Electrode>

Figure 1:
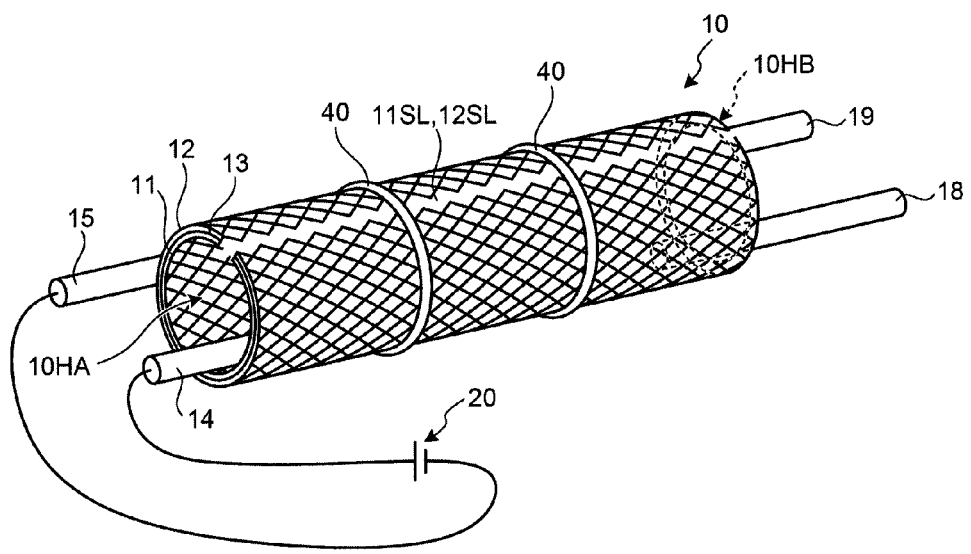
FIG. 1 is a perspective view illustrating a hydrogen-containing water generating electrode according to the present embodiment.
Figure 2:
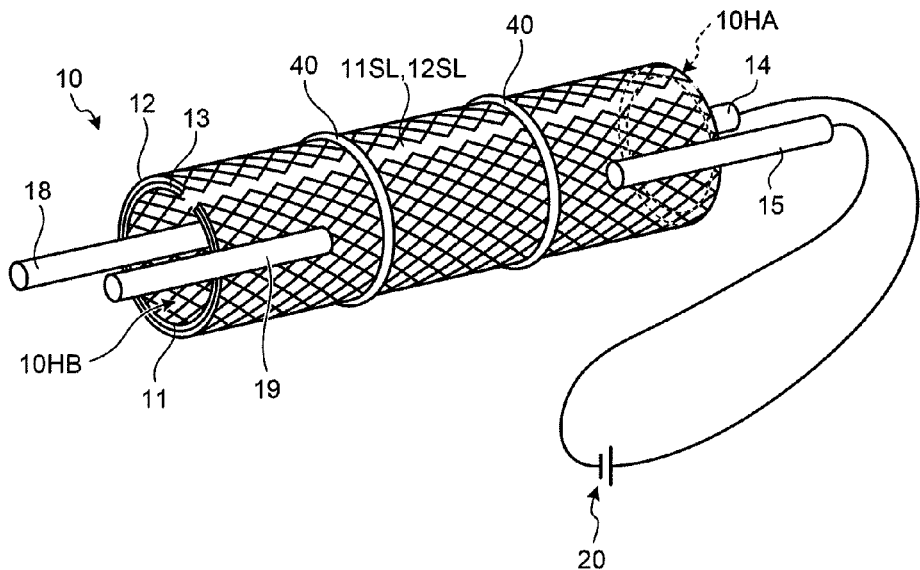
FIG. 2 is a perspective view illustrating the hydrogen-containing water generating electrode according to the present embodiment.

FIGS. 1 and 2 are perspective views illustrating a hydrogen-containing water generating electrode according to the present embodiment. A hydrogen-containing water generating electrode 10 generates hydrogen-containing water that is water containing hydrogen, from raw water such as tap water, using an electrolysis action of water. The hydrogen-containing water is alkaline water. As illustrated in FIGS. 1 and 2, the hydrogen-containing water generating electrode 10 includes a positive electrode 11, a negative electrode 12, and an insulator 13. The positive electrode 11 and the negative electrode 12 are a tubular conductor. In the present embodiment, shapes of the positive electrode 11 and the negative electrode 12 are, but not limited to, a cylindrical shape. The insulator 13 is provided on an outer peripheral portion of the positive electrode 11, and is in contact with the positive electrode 11. The negative electrode 12 is provided on an outer peripheral portion of the insulator 13, and is in contact with the insulator 13. That is, the insulator 13 is provided between the positive electrode 11 and the negative electrode 12 provided outside the positive electrode 11, and is in contact with the positive electrode 11 and the negative electrode 12. The positive electrode 11, the negative electrode 12, and the insulator 13 are a net-like member. In the present embodiment, the insulator 13 is in contact with the positive electrode 11 and the negative electrode 12. However, the insulator 13 may not necessarily contact with the positive electrode 11 and the negative electrode 12.

A positive-electrode power feed member 14 that is a rod-like conductor is electrically connected with the positive electrode 11. A negative-electrode power feed member 15 that is a rod-like conductor is electrically connected with the negative electrode 12. The positive-electrode power feed member 14 is electrically connected with a positive electrode of a power source (direct-current power source) 20. The negative-electrode power feed member 15 is electrically connected with a negative electrode of the power source 20. With such a structure, the positive electrode 11 is electrically connected with the positive electrode of the power source 20 through the positive-electrode power feed member 14, and the negative electrode 12 is electrically connected with the negative electrode of the power source 20 through the negative-electrode power feed member 15.

In the present embodiment, a positive-electrode support member 18 that is a rod-like member is mounted to the positive electrode 11. The positive-electrode support member 18 is mounted to the positive electrode 11 at a side opposite to the side where the positive-electrode power feed member 14 is mounted. A negative-electrode support member 19 that is a rod-like member is mounted to the negative electrode 12. The negative-electrode support member 19 is mounted to the negative electrode 12 at a side opposite to the side where the negative-electrode power feed member 15 is mounted. In the present embodiment, all of the positive-electrode support member 18, the negative-electrode support member 19, the positive-electrode power feed member 14, and the negative-electrode power feed member 15 are, but not limited to, of the same material. For example, the positive-electrode power feed member 14 and the negative-electrode power feed member 15 may be the same material, and the positive-electrode support member 18 and the negative-electrode support member 19 may be a different material from the material of the positive-electrode power feed member 14 and the negative-electrode power feed member 15. In the present embodiment, the positive electrode 11 and the negative electrode 12 may not necessarily be provided with the positive-electrode support member 18 and the negative-electrode support member 19.

As illustrated in FIGS. 1 and 2, the hydrogen-containing water generating electrode 10, to be specific, the positive electrode 11 and the negative electrode 12 include end-portion-side opening portions 10HA and 10HB as opening portions at both end portions. The hydrogen-containing water generating electrode 10 may not include the end-portion-side opening portions 10HA and 10HB, or may include the end-portion-side opening portion 10HA or the end-portion-side opening portion 10HB at least at one end portion.

The positive electrode 11 includes a slit 11SL extending in a longitudinal direction, that is, in a direction in which the positive electrode 11 as a tubular member extends. The negative electrode 12 includes a slit 12SL extending in the longitudinal direction, that is, in a direction in which the negative electrode 12 as a tubular member extends. As illustrated in FIGS. 1 and 2, the hydrogen-containing water generating electrode 10 includes restraining members 40 between the negative-electrode power feed member 15 and the negative-electrode support member 19, and on outside portions of the negative electrode 12. The restraining members 40 closes the slit 11SL of the positive electrode 11 and the slit 12SL of the negative electrode 12 to restrain the negative electrode 12, the insulator 13, and the positive electrode 11 from a circumferential direction of the negative electrode 12 and the positive electrode 11. Next, a use state of the hydrogen-containing water generating electrode 10 will be described.

Figure 3:
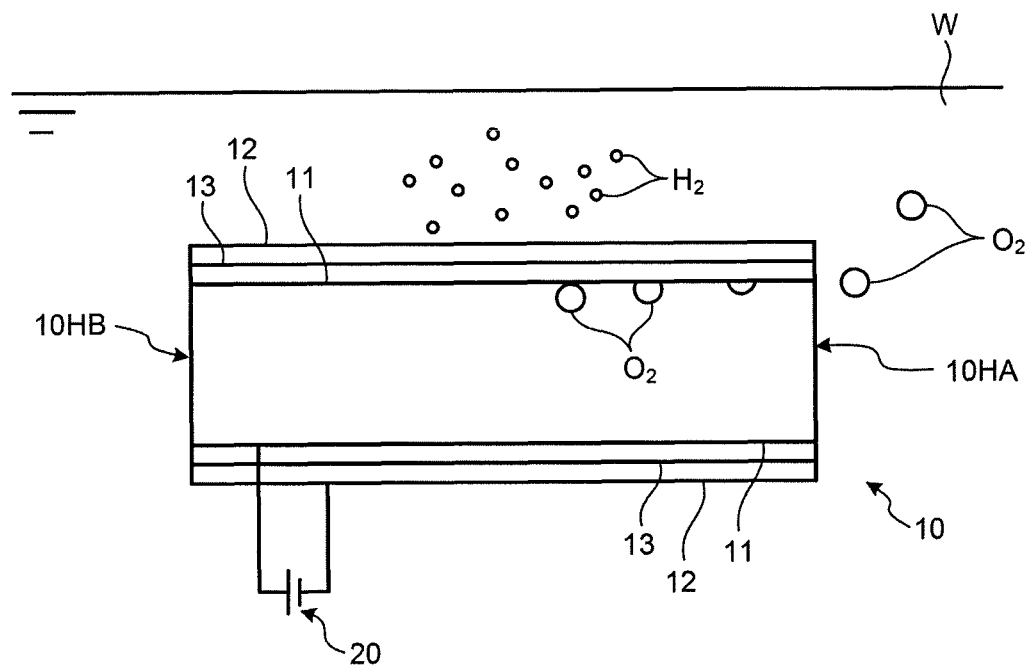
FIG. 3 is a diagram illustrating a use state of a hydrogen-containing water generating electrode according to the present embodiment.

FIG. 3 is a diagram illustrating a use state of the hydrogen-containing water generating electrode according to the present embodiment. The hydrogen-containing water generating electrode 10 is put in raw water W, and generates hydrogen-containing water in the raw water W. The hydrogen-containing water generating electrode 10 is not an installation type, and is applicable to a portable device that can be brought into a place where the device is used, that is, where the hydrogen-containing water is generated, and be put in the raw water W and generate the hydrogen-containing water. The raw water W is, for example, warm water stored in a bath, drinking water stored in a drinking water tank, rinse water stored in a rinse water tank, or the like. When a predetermined voltage (direct-current voltage) is applied from the power source 20 to between the positive electrode 11 and the negative electrode 12 of the hydrogen-containing water generating electrode 10 put in the raw water W, the raw water W existing around the hydrogen-containing water generating electrode 10 is ionized into hydrogen ions $H^+$ and hydroxyl ions $OH^-$.

When the insulator 13 does not have an ion exchange function, the ionized hydrogen ions $H^+$ pass through the insulator 13 and are gathered to the negative electrode 12 side, and bubbles of a hydrogen gas ($H_2$) are generated at the negative electrode 12. These bubbles are minute bubbles with a diameter in the nanometer order. The raw water W ($2H_2O$) is split to form $H_2+2OH^-$ with an electron ($2e^-$). The hydrogen gas is dissolved in the raw water W by the water-forming function. Therefore, the hydrogen-containing water in which hydrogen is dissolved in the raw water W is generated. The ionized hydroxyl ions $OH^-$ pass through the insulator 13 and are gathered to the positive electrode 11 side, and the raw water W ($2H_2O$) is split to form $O_2+4H^+ +4e^-$, and acid ion water is generated. $O_2$ is gathered to an inside of the tubular positive electrode 11 as bubbles, are moved along the inside of the positive electrode 11, and are released from the end-portion-side opening portions 10HA and 10HB to an outside of the positive electrode 11. Next, the hydrogen-containing water generating electrode 10 will be described in more detail.

Figure 4:
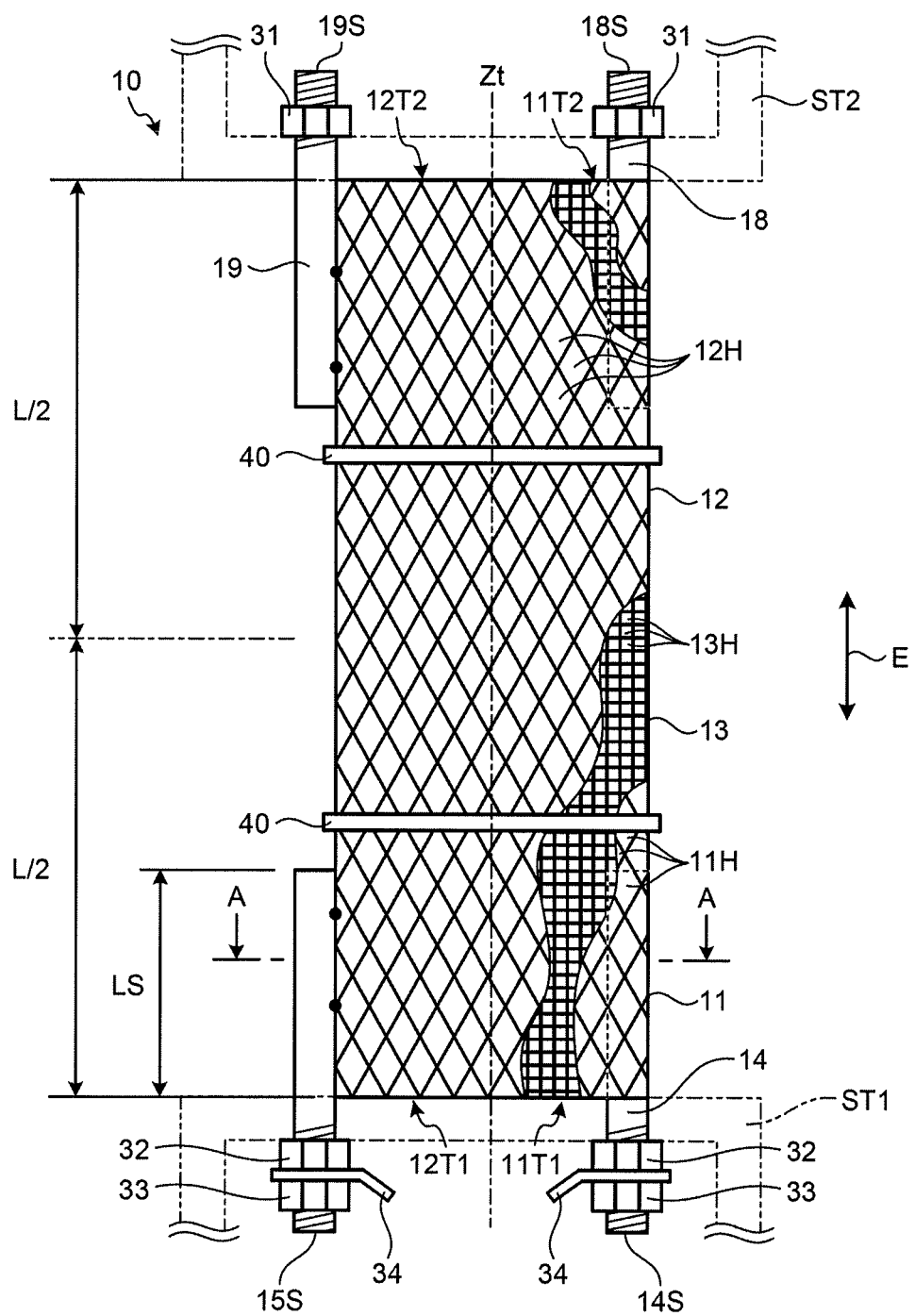
FIG. 4 is a side view illustrating the hydrogen-containing water generating electrode according to the present embodiment.
Figure 5:
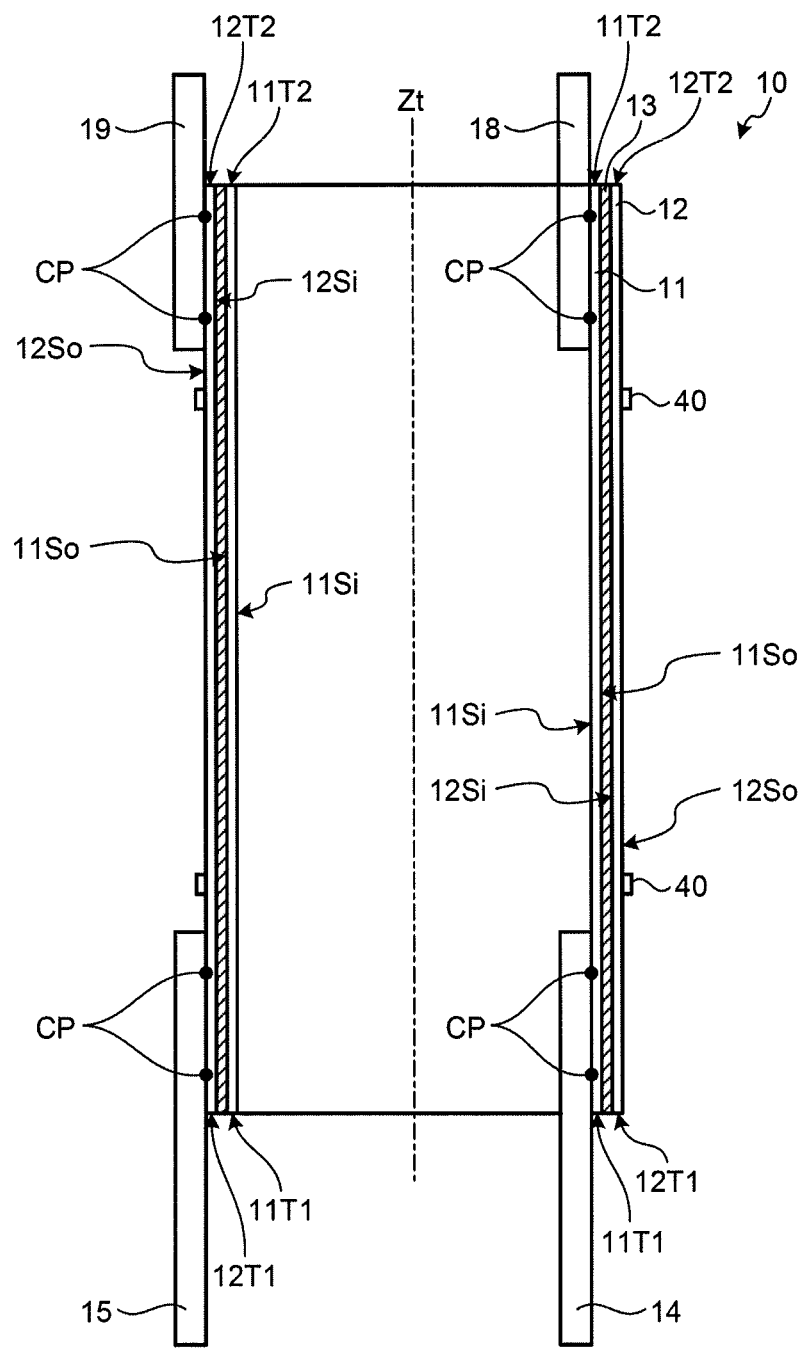
FIG. 5 is a diagram illustrating a cross section of the hydrogen-containing water generating electrode according to the present embodiment taken along a plane including a central axis of the electrode.
Figure 6:
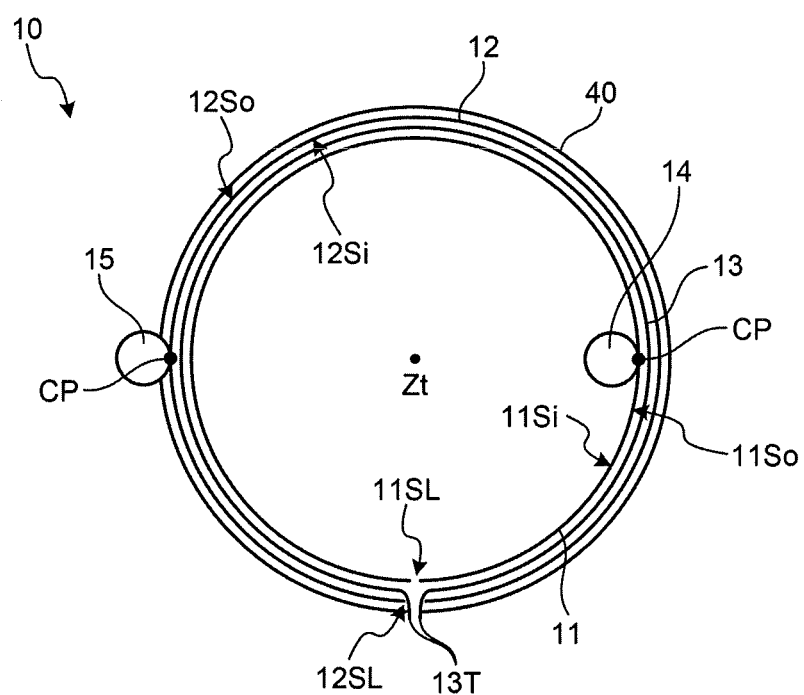
FIG. 6 is an A-A cross-sectional view of FIG. 4.
Figure 7:
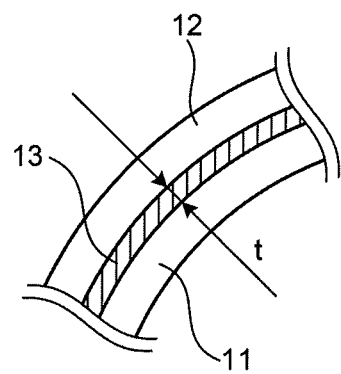
FIG. 7 is a partially enlarged diagram of FIG. 6.

FIG. 4 is a side view of the hydrogen-containing water generating electrode according to the present embodiment. FIG. 4 illustrates a state in which a part of the negative electrode 12 and the insulator 13 of the hydrogen-containing water generating electrode 10 is removed. FIG. 5 is a diagram illustrating a cross section of the hydrogen-containing water generating electrode according to the present embodiment taken along a plane including a central axis of the electrode. FIG. 6 is an A-A cross-sectional view of FIG. 4. FIG. 7 is a partially enlarged diagram of FIG. 6. A direction parallel to a direction (hereinafter, appropriately referred to as longitudinal direction) E in which the tubular positive electrode 11 and negative electrode 12 having a cylindrical shape in the present embodiment extend is a central axis Zt of these electrodes. The central axis Zt is an axis passing through a center (gravity center) in cross sections of the positive electrode 11 and the negative electrode 12, the cross sections being perpendicular to the central axis Zt.

As illustrated in FIG. 4, the positive electrode 11 includes a plurality of openings 11H in a side portion, and the negative electrode 12 includes a plurality of openings 12H in a side portion. The plurality of openings 11H included in the positive electrode 11 penetrates the side portion of the positive electrode 11 in a thickness direction of the positive electrode 11. The plurality of openings 12H included in the negative electrode 12 penetrates the side portion of the negative electrode 12 in a thickness direction of the negative electrode 12. In the present embodiment, the positive electrode 11 and the negative electrode 12 are manufactured with a conductor. In the present embodiment, the positive electrode 11 and the negative electrode 12 are titanium (Ti) plated with platinum (Pt). The plating may be, for example, platinum (Pt)-iridium (Ir) plating. In the present embodiment, titanium is pure titanium. The positive electrode 11 and the negative electrode 12 are not limited to the titanium plated with platinum. However, it is favorable to employ a material (vanadium (V), for example), that is not dissolved in the raw water W. In the present embodiment, both of the positive electrode 11 and the negative electrode 12 are plated. However, only the positive electrode 11, on which calcium hydroxide, magnesium hydroxide, or the like in the raw water is deposited, is plated, and the negative electrode 12 may not be plated. In this way, the manufacturing cost of the hydrogen-containing water generating electrode 10 can be decreased.

As illustrated in FIG. 5, the insulator 13 lying between an outer side portion (outside portion) 11So of the positive electrode 11, and an inner side portion (inside portion) 12Si of the negative electrode 12 is in contact with the outside portion 11So of the positive electrode 11 and the inside portion 12Si of the negative electrode 12. The insulator 13 includes a plurality of openings 13H. The openings 13H penetrate the insulator 13 in a thickness direction of the insulator 13. As the insulator 13, a net woven with fiber of a material having insulation properties (a resin, for example) can be used. Further, the insulator 13 may have an ion exchange function. For example, the insulator 13 may be an ion-exchange membrane (positive ion-exchange membrane). In this case, the insulator 13 may not include the openings 13H.

The positive ion-exchange membrane is negatively charged due to an anionic group fixed to the membrane. Therefore, the negative ion is repelled and cannot pass through, and only the positive ion can pass through. Therefore, in the hydrogen-containing water generating electrode 10, the insulator 13 using the positive ion-exchange membrane transmits only the positive ion, that is, the hydrogen ion $H^+$, and repels the negative ion, that is, the ionized hydroxyl ion $OH^-$. Therefore, the amount of the hydroxyl ion $OH^-$ that passes through the insulator 13 and is moved to the positive electrode 11 side can be decreased. As a result, generation of oxygen and the acid ion water can be suppressed at the positive electrode 11 side.

As described above, while the ion-exchange membrane may be used, an electrically neutral material is used as the insulator 13. In doing so, the manufacturing cost of the insulator can be decreased, and processing becomes easy. Further, the ion-exchange membrane has a hole that transmits the ions but does not transmit water molecules. If the ion-exchange membrane is used as the insulator 13, the hydrogen-containing water generating electrode 10 provided with the insulator 13 requires a high voltage in generating the hydrogen-containing water, and the power consumption may become large. In the present embodiment, the insulator 13 is an electrically neutral net-like member. Therefore, the hydrogen-containing water can be generated at a lower voltage than the case of the ion-exchange membrane, and the power consumption can be suppressed.

When a net woven with fiber having insulation properties is used as the insulator 13, the thickness of the insulator 13 is about 0.1 to 1 mm. As illustrated in FIG. 6, in the present embodiment, an end portion 13T of the insulator 13 provided between the outside portion (corresponding to an outer peripheral portion) 11So of the positive electrode 11 and the inside portion (corresponding to an inner peripheral portion) 12Si of the positive electrode 12 is taken out through the slit 12SL of the negative electrode 12 to an outside portion (corresponding to an outer peripheral portion) 12So side of the negative electrode 12. The end portion 13T of the insulator 13 may be taken out through the slit 11SL of the positive electrode 11 to an inside portion (corresponding to an inner peripheral portion) 11Si side of the positive electrode 11. Next, influence of a size t of a gap (appropriately, referred to as interelectrode gap) formed between the positive electrode 11 and the negative electrode 12 illustrated in FIG. 7 will be described. The size t of the interelectrode gap is a distance between the outside portion (outer peripheral portion) 11So of the positive electrode 11, and the inside portion (inner peripheral portion) 12Si of the negative electrode 12.

Amounts of dissolved hydrogen of the hydrogen-containing water are compared when the size t of the interelectrode gap illustrated in FIG. 7 is changed. In this evaluation, t=0.4 mm and 3 mm. When t=0.4 mm, the voltage applied to the hydrogen-containing water generating electrode 10 is 18 V, and the current is 5 A. When t=3 mm, the voltage applied to the hydrogen-containing water generating electrode 10 is 60 V, and the current is 5 A. Results are illustrated in Table 1. The dissolved hydrogen in Table 1 is a measured value of when 15 minutes has passed from when the hydrogen-containing water generating electrode 10 is put in hot water of 120 liters, 41° C., and the voltage is applied to the positive electrode 11 and the negative electrode 12.

TABLE 1

| Item | Size of interelectrode gap (t) 0.4 mm | Size of interelectrode gap (t) 3.0 mm | Ratio (where t = 3.0 mm is 100) |
|---|---|---|---|
| Electrolytic voltage (DCV) | 18 | 60 | 30 |
| Electrolytic current (DCA) | 5 | 5 | — |
| Power consumption (DCW) | 90 | 300 | 30 |
| Dissolved hydrogen (ppm) Average value of n = 3 | 0.4 | 0.37 | 108 |

It can be seen that, from the evaluation results illustrated in Table 1, the amount of hydrogen (dissolved hydrogen amount) dissolved in the raw water becomes larger as the size t of the interelectrode gap becomes smaller. To be specific, when the size t of the interelectrode gap is 0.4 mm, the dissolved hydrogen amount is increased by 8%, compared with a case of t=3.0 mm. When the size t of the interelectrode gap is 0.4 mm, the power consumption is slightly more than ⅓, compared with the case of t=3.0 mm. When the size t of the interelectrode gap is 0.4 mm, a larger amount of hydrogen can be dissolved in the raw water with smaller power consumption, compared with the case of t=3.0 mm. That is, efficiency to dissolve hydrogen in the raw water of the hydrogen-containing water generating electrode 10 can be improved by making the size t of the interelectrode gap small.

In the present embodiment, it is favorable to cause the size t of the interelectrode gap to be from 0.1 to 1 mm, both inclusive. By causing the size t of the interelectrode gap to fall within the above-described range, the hydrogen-containing water generating electrode 10 can generate a sufficient amount of hydrogen even if a potential difference between the voltages applied to the positive electrode 11 and to the negative electrode 12 is relatively small, in generating the hydrogen-containing water. If the size t of the interelectrode gap falls within the above-described range, the hydrogen-containing water generating electrode 10 can cause a sufficient amount of hydrogen to be dissolved in the raw water, and can generate the hydrogen-containing water in which a large amount of hydrogen is dissolved, even if the voltage applied to the hydrogen-containing water generating electrode 10 is relatively small. Therefore, for example, the hydrogen-containing water generating electrode 10 can be used for a case in which the hydrogen-containing water generating electrode 10 is put in warm water stored in a bath to generate the hydrogen-containing water. Further, if the amount of hydrogen dissolved in the hydrogen-containing 3 water is the same, the hydrogen-containing water generating electrode 10 can suppress the power consumption.

To dissolve a sufficient amount of hydrogen in the raw water when the size t of the interelectrode gap is large, the voltage to be applied to the hydrogen-containing water generating electrode 10 is made large. By causing the size t of the interelectrode gap to be 1 mm or less, preferably, 0.6 mm or less, a sufficient amount of hydrogen can be dissolved in the raw water, even if the voltage to be applied to the hydrogen-containing water generating electrode 10 is about 48 V, for example. By causing the size t of the interelectrode gap to be 0.1 mm or more, preferably, 0.2 mm or more, insulation between the positive electrode 11 and the negative electrode 12 by the insulator 13 lying between the positive electrode 11 and the negative electrode 12 can be sufficiently secured. As a result, the hydrogen-containing water generating electrode 10 can stably exhibit performance. Further, as described above, when a resin is used as the insulator 13, by causing the size t of the interelectrode gap to be 0.1 mm or more, preferably, 0.2 mm or more, a decrease in durability of the insulator 13 can be suppressed. In the present embodiment, the insulator 13 lying between the positive electrode 11 and the negative electrode 12 is in contact with both of the positive electrode 11 and the negative electrode 12. Therefore, the size t of the interelectrode gap is determined according to the thickness of the insulator 13.

In the present embodiment, the hydrogen-containing water generating electrode 10 is directly put in a bath or a drinking water tank, and generates the hydrogen-containing water. Then, when generation of the hydrogen-containing water is not necessary, the hydrogen-containing water generating electrode 10 is taken out of the bath or the drinking water tank. As described above, the hydrogen-containing water generating electrode 10 is not used by being installed to a mounting object, and can be moved or carried. Therefore, the hydrogen-containing water generating electrode 10 is subject to influence of vibration and impact, compared with one installed and used. When the insulator 13 is brought to lie between the positive electrode 11 and the negative electrode 12 and to come in contact with the positive electrode 11 and the negative electrode 12, movement of the positive electrode 11 and the negative electrode 12 of the hydrogen-containing water generating electrode 10 is controlled. As a result, resistance of the hydrogen-containing water generating electrode 10 to the vibration and impact is improved.

Further, when the insulator 13 is brought to lie between the positive electrode 11 and the negative electrode 12 and to come in contact with the positive electrode 11 and the negative electrode 12, the space between the positive electrode 11 and the negative electrode 12 can be easily made constant with the insulator 13 throughout the entire hydrogen-containing water generating electrode 10. As a result, in the hydrogen-containing water generating electrode 10, variation of electrical resistance between the positive electrode 11 and the negative electrode 12 is suppressed, and variation of current density is suppressed. Therefore, the hydrogen bubbles can be uniformly generated from the entire electrode. By causing the size t of the interelectrode gap to be equal to the thickness of the insulator 13, the insulator 13 can be easily brought to come in contact with both of the positive electrode 11 and the negative electrode 12. Therefore, it is favorable. Next, the positive-electrode power feed member 14 and the negative-electrode power feed member 15 will be described.

As illustrated in FIG. 4, the positive-electrode power feed member 14 is a rod-like conductor extending from a first end portion (one end portion) 11T1 of the positive electrode 11 to a second end portion (the other end portion) 11T2. As illustrated in FIGS. 5 and 6, a portion of the positive-electrode power feed member 14, the portion being shorter than half L/2 of a dimension L of the positive electrode 11 in the direction (longitudinal direction) E in which the positive electrode 11 extends, is mounted to the inside portion 11Si of the positive electrode 11. The negative-electrode power feed member 15 is a rod-like conductor extending from a first end portion 12T1 of the negative electrode 12 to a second end portion 12T2. As illustrated in FIGS. 5 and 6, a portion of the negative-electrode power feed member 15, the portion being shorter than half L/2 of a dimension L of the negative electrode 12 in the direction (longitudinal direction) E in which the negative electrode 12 extends, is mounted to the outside portion 12So of the negative electrode 12. Both of the length of the portion of the positive-electrode power feed member 14 mounted to the positive electrode 11, and the length of the portion of the negative-electrode power feed member 15 mounted to the negative electrode 12 are LS. In the present embodiment, LS<L/2 is satisfied.

As illustrated in FIG. 4, the positive-electrode support member 18 is a rod-like conductor extending from the second end portion 11T2 of the positive electrode 11 to the first end portion 11T1. As illustrated in FIG. 5, a portion of the positive-electrode support member 18, the portion being shorter than the half L/2 of the dimension L of the positive electrode 11 in the longitudinal direction E of the positive electrode 11, is mounted to the inside portion 11Si of the positive electrode 11. The negative-electrode support member 19 is a rod-like conductor extending from a second end portion 12T2 of the negative electrode 12 to the first end portion 12T1. As illustrated in FIG. 5, a portion of the negative-electrode support member 19, the portion being shorter than the half L/2 of the dimension L of the negative electrode 12 in the longitudinal direction E of the negative electrode 12, is mounted to the outside portion 12So of the negative electrode 12.

In the present embodiment, the positive-electrode power feed member 14, the negative-electrode power feed member 15, the positive-electrode support member 18, and the negative-electrode support member 19 are members of titanium plated with platinum, similarly to the positive electrode 11 and the negative electrode 12. The positive-electrode power feed member 14, the negative-electrode power feed member 15, the positive-electrode support member 18, and the negative-electrode support member 19 are not limited to the titanium plated with platinum, similarly to the positive electrode 11 and the negative electrode 12. However, it is favorable to employ a material that is not dissolved in the raw water W. The positive-electrode power feed member 14 and the negative-electrode power feed member 15 are respectively joined with and are electrically connected with the positive electrode 11 and the negative electrode 12 by joining means such as welding. The positive-electrode power feed member 14 and the negative-electrode power feed member 15 are respectively joined with and mounted to the positive electrode 11 and the negative electrode 12 by joining means such as welding.

The plating applied to the positive-electrode power feed member 14, the negative-electrode power feed member 15, the positive-electrode support member 18, and the negative-electrode support member 19 may be, for example, platinum (Pt)-iridium (Ir) plating. In the present embodiment, the negative electrode 12 may not be plated, and in this case, the negative-electrode power feed member 15 may also not be plated.

In the present embodiment, as illustrated in FIG. 5, the positive-electrode power feed member 14 and the negative-electrode power feed member 15 are respectively electrically joined with the positive electrode 11 and the negative electrode 12 at joined portions CP in a plurality of places by spot welding. The positive-electrode support member 18 and the negative-electrode support member 19 are similar to the positive-electrode power feed member 14 and the negative-electrode power feed member 15. The joining of the positive-electrode power feed member 14 and the negative-electrode power feed member 15 is not limited to the spot welding.

The plurality of joined portions CP is provided not to be shifted to one place in the longitudinal direction of the positive-electrode power feed member 14 and the negative-electrode power feed member 15. In doing so, the positive-electrode power feed member 14 and the negative-electrode power feed member 15 can supply the power from the entire own length in the longitudinal direction E. The portions of the negative-electrode power feed member 15 and the negative-electrode support member 19, the portions being shorter than the half L/2 of the dimension L of the negative electrode 12 in the direction (longitudinal direction) E in which the negative electrode 12 extends, is mounted to the outside portion 12So of the negative electrode 12, as separate members. Therefore, a portion (gap) where the negative-electrode power feed member 15 and the negative-electrode support member 19 do not exist is caused between the negative-electrode power feed member 15 and the negative-electrode support member 19, in the outside portion 12So of the negative electrode 12. The hydrogen-containing water generating electrode 10 can have the restraining members 40 mounted to the portion where the negative-electrode power feed member 15 and the negative-electrode support member 19 do not exist, in the outside portion 12So of the negative electrode 12. The restraining members 40 do not interfere with the negative-electrode power feed member 15 and the negative-electrode support member 19. Therefore, the restraining members 40 can restrain the negative electrode 12, the insulator 13, and the positive electrode 11 with uniform force throughout the entire outer peripheral portion of the negative electrode 12.

As illustrated in FIGS. 4 and 5, the positive-electrode power feed member 14 protrudes from the first end portion 11T1 of the positive electrode 11, and the negative-electrode power feed member 15 protrudes from the first end portion 12T1 of the negative electrode 12. In doing so, the positive-electrode power feed member 14 and the negative-electrode power feed member 15 can cause the portions protruding from the first end portions 11T1 and 12T1 to be mounted to a mounting object ST1, as illustrated in FIG. 4. As a result, the positive electrode 11 and the negative electrode 12 are mounted to the mounting object ST1 through the positive-electrode power feed member 14 and the negative-electrode power feed member 15.

In the present embodiment, the positive-electrode power feed member 14 and the negative-electrode power feed member 15 are provided with male screws 14S and 15S on the portions protruding from the first end portions 11T1 and 12T1, as illustrated in FIG. 4. The positive-electrode power feed member 14 and the negative-electrode power feed member 15 are mounted and fixed to the mounting object ST1 with bolts 32 and 32 respectively screwed into the male screws 14S and 15S.

The first end portion 11T1 of the positive electrode 11 is in contact with the mounting object ST1, and is fixed to the mounting object ST1 through the positive-electrode power feed member 14 with the bolt 32. Similarly, the first end portion 12T1 of the negative electrode 12 is in contact with the mounting object ST1, and is fixed to the mounting object ST1 through the negative-electrode power feed member 15 with the bolt 32. Therefore, large portions of the positive electrode 11 and the negative electrode 12 are in contact with the mounting object ST1, and thus can be stably mounted to the mounting object ST1.

Further, a terminal 34 that electrically connects the positive-electrode power feed member 14 and wiring, and a terminal 34 that connects the negative-electrode power feed member 15 and wiring are fixed with the respective bolts 32 and 32, and bolts 33 and 33 respectively screwed into the male screws 14S and 15S. With such a structure, the power is applied to the positive electrode 11 and the negative electrode 12 through the terminals 34 and 34, the positive-electrode power feed member 14, and the negative-electrode power feed member 15.

As illustrated in FIGS. 4 and 5, the positive-electrode support member 18 protrudes from the second end portion 11T2 of the positive electrode 11, and the negative-electrode support member 19 protrudes from the second end portion 12T2 of the negative electrode 12. In doing so, the positive-electrode power feed member 14 and the negative-electrode power feed member 15 can cause the portions protruding from the second end portions 11T2 and 12T2 to be mounted to a mounting object ST2, as illustrated in FIG. 4. As a result, the positive electrode 11 and the negative electrode 12 are mounted to the mounting object ST2 through the positive-electrode support member 18 and the negative-electrode support member 19.

In the present embodiment, the positive-electrode support member 18 and the negative-electrode support member 19 are provided with male screws 18S and 19S on the portions protruding from the second end portions 11T2 and 12T2, as illustrated in FIG. 4. The positive-electrode support member 18 and the negative-electrode support member 19 are mounted and fixed to the mounting object ST2 with bolts 31 and 31 respectively screwed into the male screws 18S and 19S.

The second end portion 11T2 of the positive electrode 11 is in contact with the mounting object ST2, and is fixed to the mounting object ST2 through the positive-electrode support member 18 with the bolt 31. Similarly, the second end portion 12T2 of the negative electrode 12 is in contact with the mounting object ST2, and is fixed to the mounting object ST2 through the negative-electrode support member 19 with the bolt 31. Therefore, large portions of the positive electrode 11 and the negative electrode 12 are in contact with the mounting object ST2, and thus can be stably mounted to the mounting object ST2.

The hydrogen-containing water generating electrode 10 can be mounted to the mounting objects ST1 and ST2 with the positive-electrode power feed member 14, the negative-electrode power feed member 15, the positive-electrode support member 18, and the negative-electrode support member 19 from both ends of the positive electrode 11 and the negative electrode 12. Further, the hydrogen-containing water generating electrode 10 may be mounted to one mounting object using either ones of the positive-electrode power feed member 14 and the negative-electrode power feed member 15, or the positive-electrode support member 18 and the negative-electrode support member 19. As described above, the hydrogen-containing water generating electrode 10 has an advantage of high flexibility of mounting.

Figure 8:
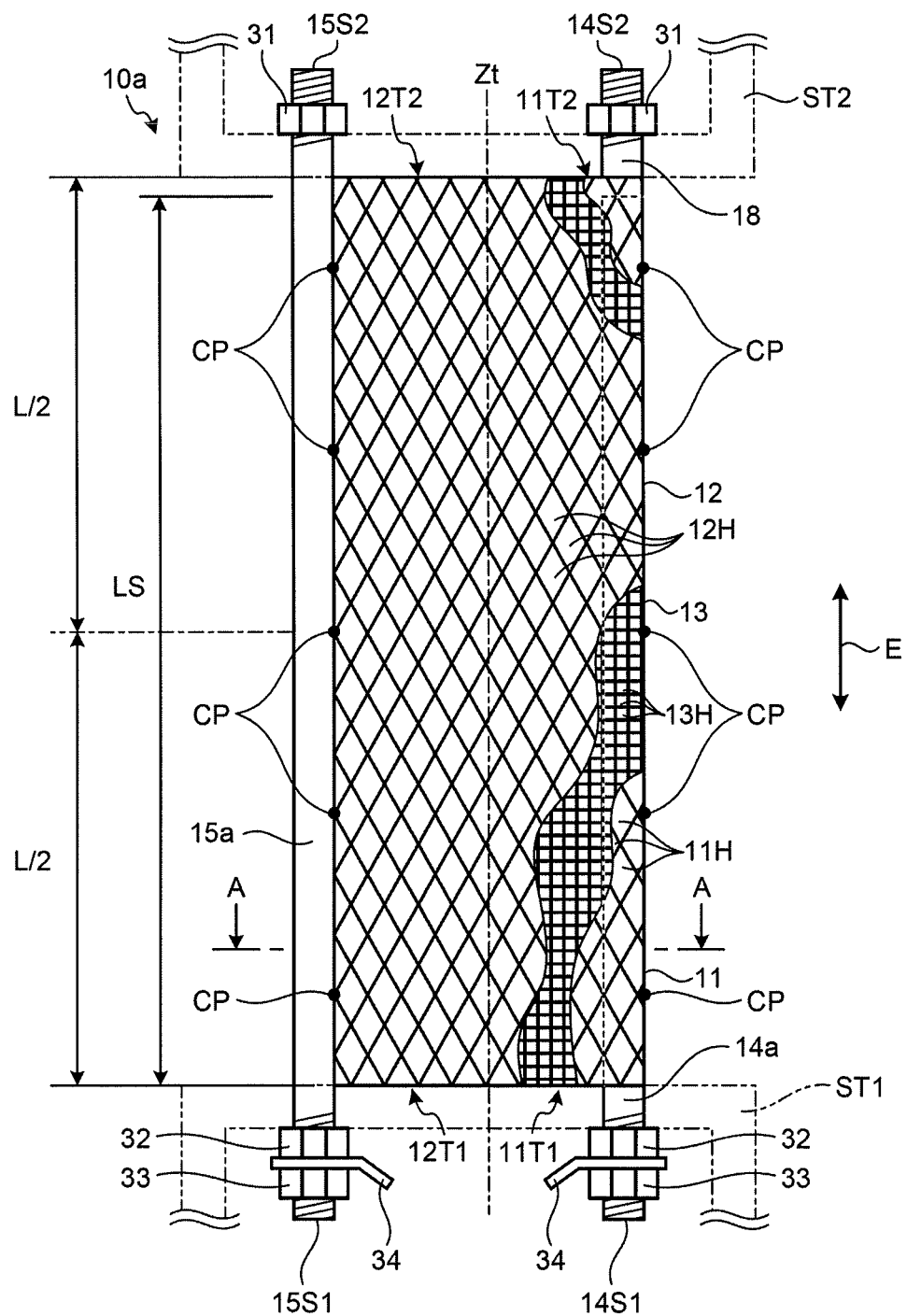
FIG. 8 is a side view illustrating a modification of the hydrogen-containing water generating electrode.
Figure 9:
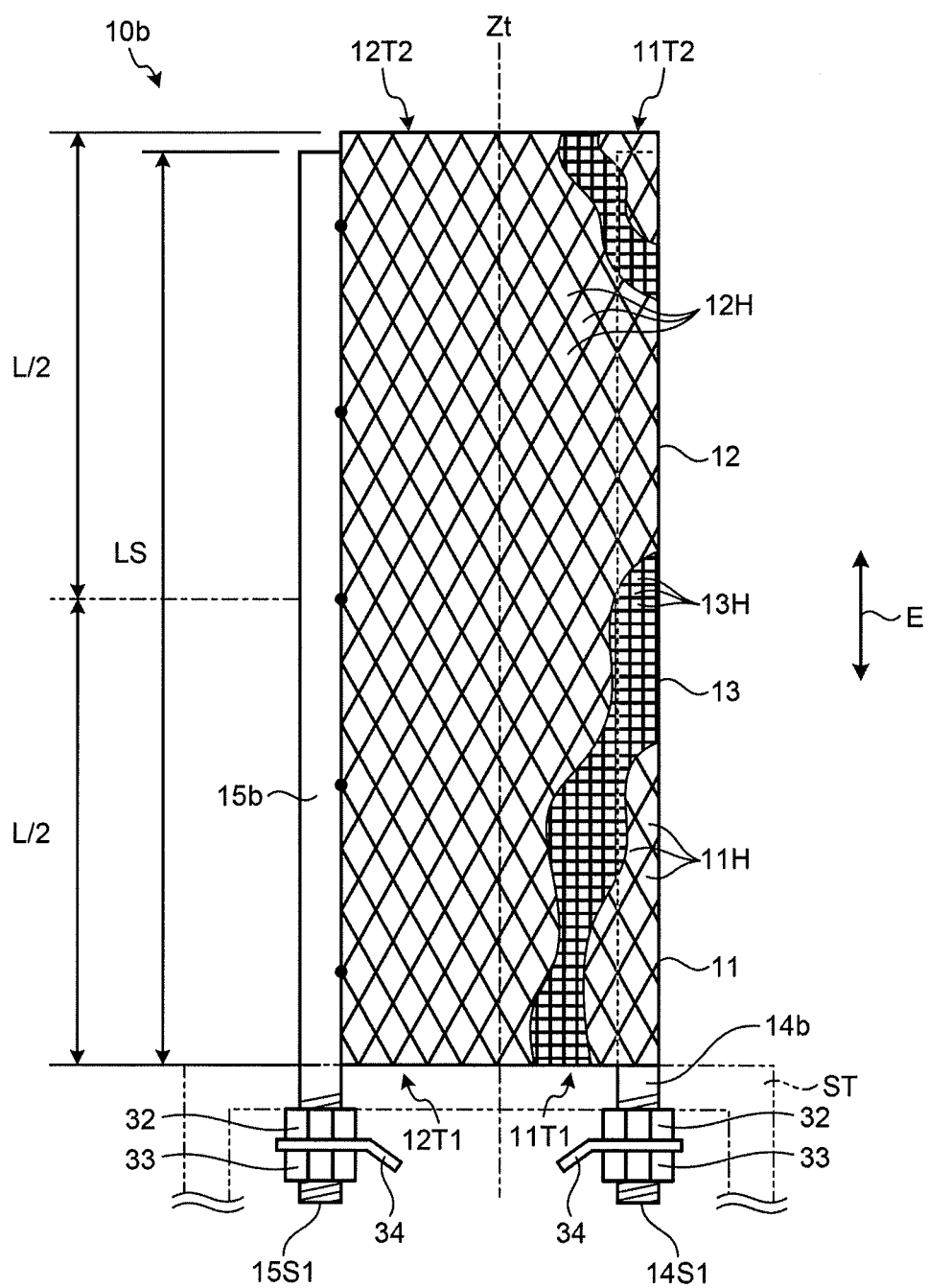
FIG. 9 is a side view illustrating a modification of the hydrogen-containing water generating electrode.

FIGS. 8 and 9 are side views illustrating modifications of a hydrogen-containing water generating electrode. In the modifications, in FIGS. 8 and 9, the restraining member 40 illustrated in FIG. 4 and the like is omitted. The restraining member 40 is mounted to a hydrogen-containing water generating electrode 10a illustrated in FIG. 8, and to a hydrogen-containing water generating electrode 10b illustrated in FIG. 9 from outsides of negative-electrode power feed members 15a and 15b mounted to outsides of negative electrodes 12.

In the hydrogen-containing water generating electrode 10a illustrated in FIG. 8, a portion of the positive-electrode power feed member 14a, the portion being longer than half L/2 of a dimension L of a positive electrode 11 in a longitudinal direction E of the positive electrode 11, is mounted to an inside portion 11Si of the positive electrode 11 illustrated in FIG. 5. A portion of a negative-electrode power feed member 15a, the portion being longer than the half L/2 of the dimension L of a negative electrode 12 in a longitudinal direction E of the negative electrode 12, is mounted to an outside portion 12So of the negative electrode 12 illustrated in FIG. 5. Both of the length of the portion of the positive-electrode power feed member 14a mounted to the positive electrode 11, and the length of the portion of the negative-electrode power feed member 15a mounted to the negative electrode 12 are LS. In the present embodiment, LS>L/2 is satisfied. The length LS is preferably 70% or more of the dimension L of the positive electrode 11 and the negative electrode 12 in the longitudinal direction E, and is more preferably 80% or more of the dimension L. In the present embodiment, the length LS is 95% or more of the dimension L.

As illustrated in FIG. 8, the positive-electrode power feed member 14a and the negative-electrode power feed member 15a are respectively electrically joined with the positive electrode 11 and the negative electrode 12 at joined portions CP in a plurality of places by spot welding. The plurality of joined portions CP is provided not to be shifted to one place in the longitudinal direction of the positive-electrode power feed member 14a and the negative-electrode power feed member 15a. In doing so, the positive-electrode power feed member 14a and the negative-electrode power feed member 15a can supply power to the positive electrode 11 and the negative electrode 12 from the entire length in the longitudinal direction E. Therefore, the hydrogen-containing water generating electrode 10a can cause current distribution of the positive electrode 11 and the negative electrode 12 in the longitudinal direction E to be close to uniform distribution. Therefore, the hydrogen-containing water generating electrode 10a can generate hydrogen from the entire region of the negative electrode 12 in the longitudinal direction E. Further, the positive electrode 11 and the negative electrode 12 are respectively electrically connected with the positive-electrode power feed member 14a and the negative-electrode power feed member 15a in the respective large ranges in the longitudinal direction E. Therefore, the hydrogen-containing water generating electrode 10a can suppress a decrease in efficiency of the current, and can efficiently use the current. That is, the hydrogen-containing water generating electrode 10a can suppress a decrease in use efficiency of the current to be applied. As a result, the hydrogen-containing water generating electrode 10a can increase hydrogen content per unit power. Further, by causing the length LS of the portion of the positive-electrode power feed member 14a mounted to the positive electrode 11, and the length LS of the portion of the negative-electrode power feed member 15a mounted to the negative electrode 12 to satisfy the above-described range, the positive electrode 11 and the negative electrode 12 can be reinforced.

As illustrated in FIG. 8, the positive-electrode power feed member 14a protrudes from both of a first end portion 11T1 and a second end portion 12T2 of the positive electrode 11. The negative-electrode power feed member 15a protrudes from both of a first end portion 12T1 and a second end portion 12T2 of the negative electrode 12. In doing so, the positive-electrode power feed member 14a and the negative-electrode power feed member 15a can cause the portions protruding from the first end portions 11T1 and 12T1 to be mounted to a mounting object ST1, and cause the portions protruding from the second end portions 11T2 and 12T2 to be mounted to a mounting object ST2, as illustrated in FIG. 8. As a result, the positive electrode 11 and the negative electrode 12 are mounted to the mounting objects ST1 and ST2 through the positive-electrode power feed member 14a and the negative-electrode power feed member 15a.

In the present embodiment, the positive-electrode power feed member 14a and the negative-electrode power feed member 15a are provided with male screws 14S1 and 15S1 on the portions protruding from the first end portions 11T1 and 12T1, as illustrated in FIG. 8. Further, the positive-electrode power feed member 14a and the negative-electrode power feed member 15a are provided with male screws 14S2 and 15S2 on the portions protruding from the second end portions 11T2 and 12T2. The positive-electrode power feed member 14a and the negative-electrode power feed member 15a are mounted and fixed to the mounting object ST1 with bolts 32 and 32 respectively screwed into the male screws 14S1 and 15S1 of the first end portion 11T1 side. Further, the positive-electrode power feed member 14a and the negative-electrode power feed member 15a are mounted and fixed to the mounting object ST2 with bolts 31 and 31 respectively screwed into the male screws 14S2 and 15S2 of the second end portion 12T2 side.

Terminals 34 and 34 that connect the positive-electrode power feed member 14 and the negative-electrode power feed member 15, and the wiring are fixed with the bolts 32, and the bolts 33 respectively screwed into the male screws 14S1 and 15S1. With such a structure, the power is applied to the positive electrode 11 and the negative electrode 12 through the terminals 34 and 34, the positive-electrode power feed member 14a, and the negative-electrode power feed member 15a. In the hydrogen-containing water generating electrode 10a, the positive-electrode power feed member 14 and the negative-electrode power feed member 15 protrude from both sides of the positive electrode 11 and the negative electrode 12. Therefore, similar functions and effects to the above-described hydrogen-containing water generating electrode 10 (see FIG. 4 and other figures) can be obtained.

The hydrogen-containing water generating electrode 10b illustrated in FIG. 9 is different from the hydrogen-containing water generating electrode 10a illustrated in FIG. 8 in that a positive-electrode power feed member 14b and a negative-electrode power feed member 15b protrude only from first end portions 11T1 and 12T1 of a positive electrode 11 and a negative electrode 12, and do not protrude from second end portions 11T2 and 12T2. Other structures of the hydrogen-containing water generating electrode 10b are similar to those of the hydrogen-containing water generating electrode 10a illustrated in FIG. 8. Therefore, the hydrogen-containing water generating electrode 10b can obtain similar functions and effects to the hydrogen-containing water generating electrode 10a illustrated in FIG. 8, except than only the first end portions 11T1 and 12T1 side of the positive electrode 11 and the negative electrode 12 are mounted to a mounting object ST.

Figure 10:
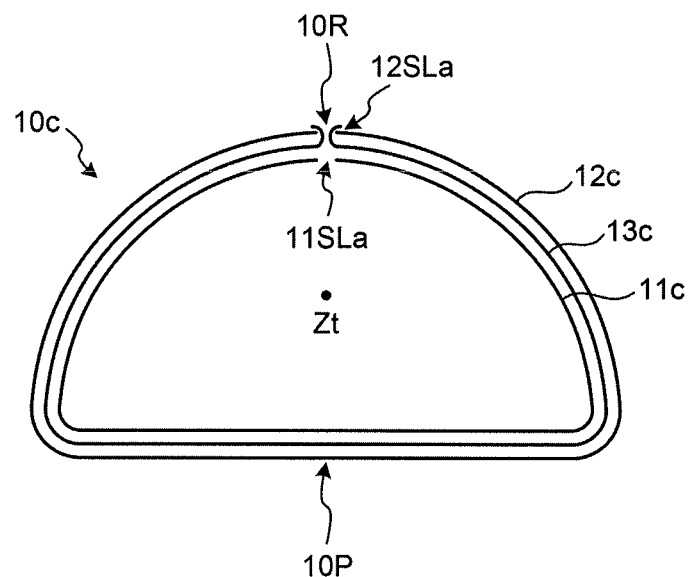
FIG. 10 is a cross-sectional view illustrating a modification of the hydrogen-containing water generating electrode.
Figure 11:
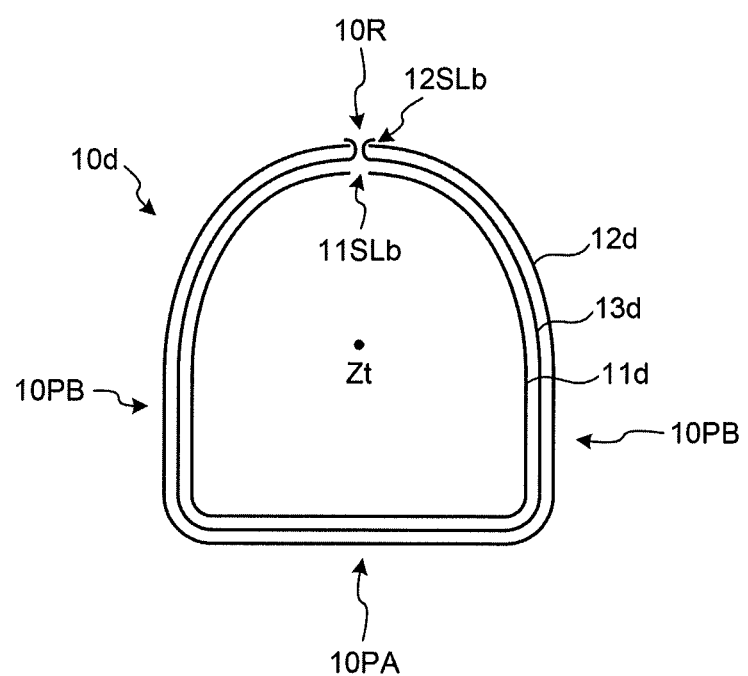
FIG. 11 is a cross-sectional view illustrating a modification of the hydrogen-containing water generating electrode.

FIGS. 10 and 11 are cross-sectional views illustrating modifications of a hydrogen-containing water generating electrode. FIGS. 10 and 11 illustrate cross sections of hydrogen-containing water generating electrodes 10c and 10d, the cross sections being perpendicular to a central axis Zt. The hydrogen-containing water generating electrode 10c illustrated in FIG. 10 includes a positive electrode 11c, a negative electrode 12c, an insulator 13c, a flat surface portion 10P, and a curved surface portion 10R connected with the flat surface portion 10P. The positive electrode 11c includes a slit 11SLa extending in a longitudinal direction, that is, in a direction in which the positive electrode 11c as a tubular member extends. The negative electrode 12c includes a slit 12SLa extending in the longitudinal direction, that is, in a direction in which the negative electrode 12c as a tubular member extends. The hydrogen-containing water generating electrode 10d illustrated in FIG. 11 includes a positive electrode 11d, a negative electrode 12d, an insulator 13d, a first flat surface portion 10PA, a pair of second flat surface portions 10PB and 10PB connected with both ends of the first flat surface portion 10PA, and a curved surface portion 10R connecting the pair of second flat surface portions 10PB and 10PB. The positive electrode 11d includes a slit 11SLb extending in a longitudinal direction, that is, in a direction in which the positive electrode 11d as a tubular member extends. The negative electrode 12d includes a slit 12SLb extending in the longitudinal direction, that is, in a direction in which the negative electrode 12d as a tubular member extends.

The positive electrodes 11c and 11d, and the negative electrodes 12c and 12d included in the hydrogen-containing water generating electrodes 10c and 10d have a shape of combination of flat surfaces and curved surfaces. Further, the hydrogen-containing water generating electrodes 10, 10a, and 10b illustrated in FIGS. 1, 2, 8, 9, and other figures have a cylindrical shape, and thus have a curved surface throughout the entire circumferences of the positive electrodes 11 and the negative electrodes 12. As described above, in the present embodiment, at least a part of the positive electrodes 11, 11c, and 11d, and the negative electrode 12, 12c, and 12d included in the hydrogen-containing water generating electrodes 10, 10a, 10b, 10c, and 10d may just have a curved surface. The hydrogen-containing water generating electrode 10 can cause the bubbles of hydrogen to be efficiently separated from the negative electrode 12 throughout the entire circumference, and can cause hydrogen to be dissolved in the raw water W, by forming the positive electrode 11 and the negative electrode 12 in the cylindrical shape. Further, the hydrogen-containing water generating electrode 10 can be easily manufactured by forming the positive electrode 11 and the negative electrode 12 in the cylindrical shape.

The hydrogen-containing water generating electrodes 10, 10a, 10b, 10c, and 10d can efficiently generate hydrogen by forming the positive electrodes 11, 11c, and 11d, and the negative electrodes 12, 12c, and 12d in a shape including a curved surface. When the hydrogen-containing water generating electrodes 10, 10a, 10b, 10c, or 10d is put in the raw water W and used, it is favorable to install the hydrogen-containing water generating electrode so that the curved surface portion faces upward (a side of a direction opposite to a direction in which the gravity acts). Next, the openings 11H, 12H, and 13H included in the positive electrode 11, the negative electrode 12, and the insulator 13 will be described.

Figure 12:
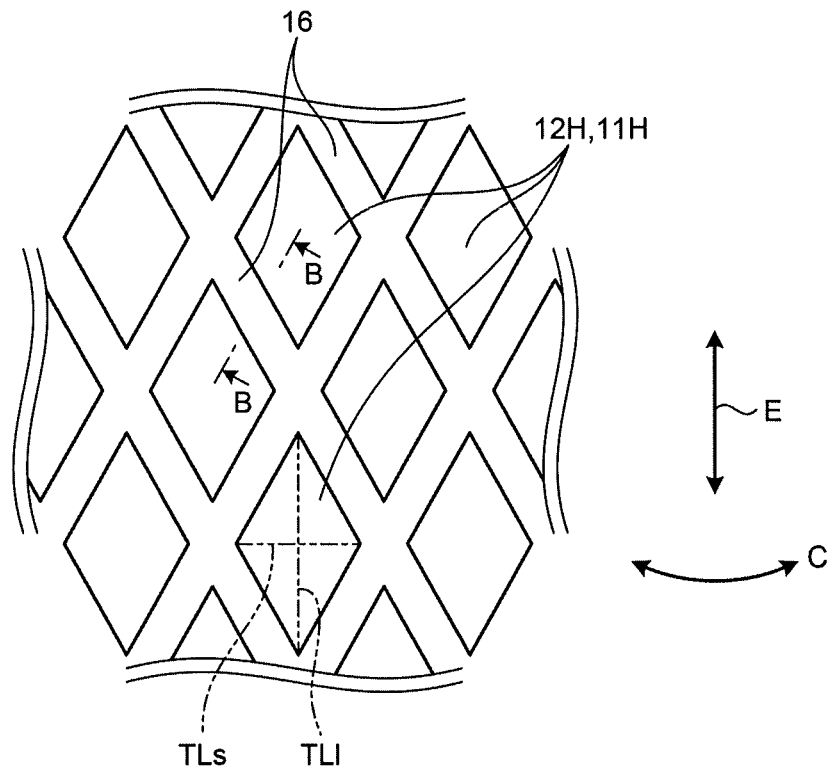
FIG. 12 is a diagram illustrating a partially enlarged positive electrode and a partially enlarged negative electrode.
Figure 13:
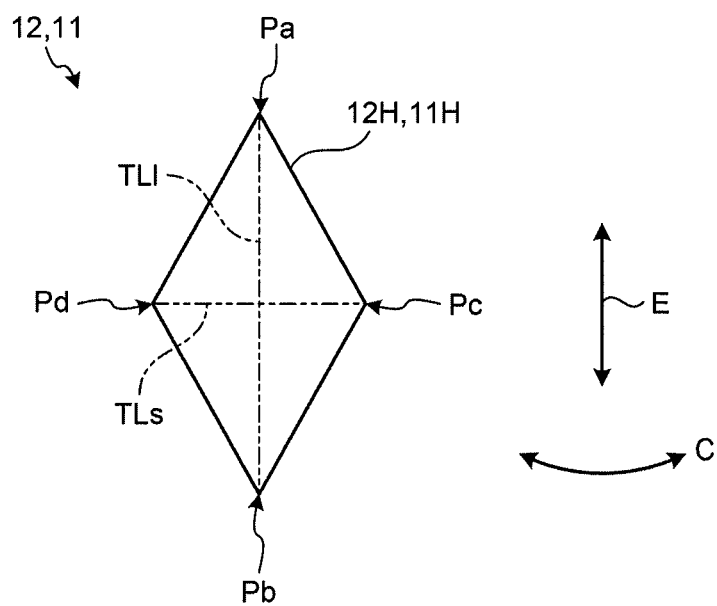
FIG. 13 is an enlarged diagram of an opening included in the positive electrode and the negative electrode.
Figure 14:
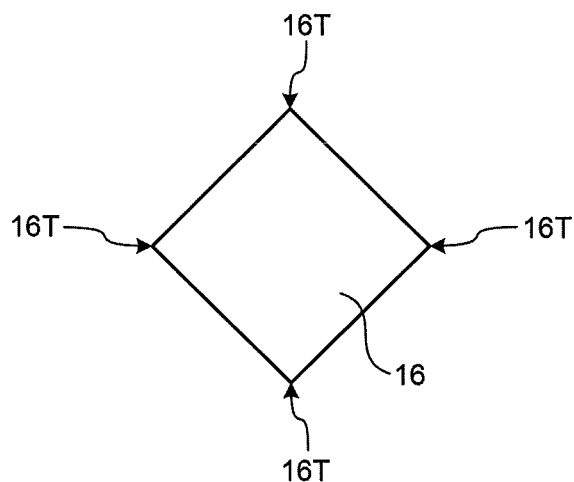
FIG. 14 is a B-B cross-sectional view of FIG. 12.
Figure 15:
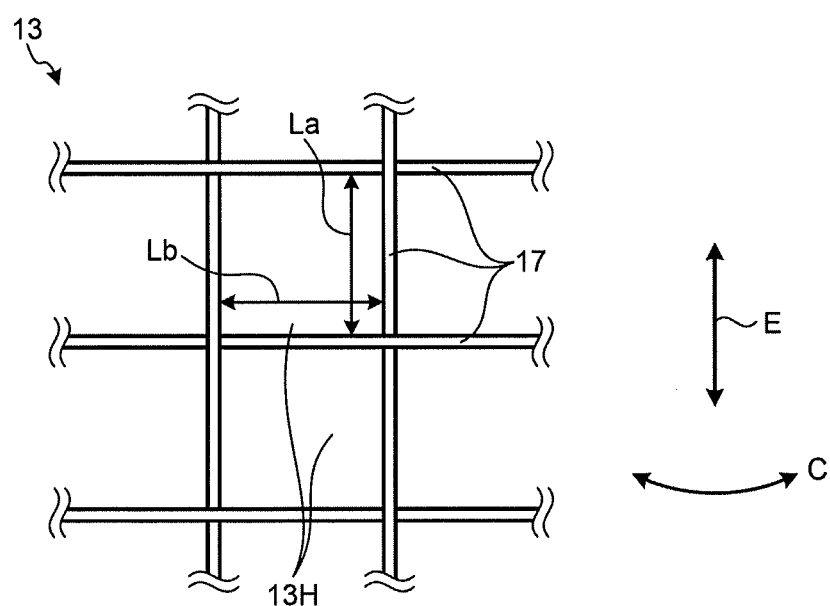
FIG. 15 is a diagram illustrating a partially enlarged insulator.

FIG. 12 is a diagram illustrating a partially enlarged positive electrode and a partially enlarged negative electrode. FIG. 13 is an enlarged view of openings included in the positive electrode and the negative electrode. FIG. 14 is a B-B cross-sectional view of FIG. 12. FIG. 15 is a diagram illustrating a partially enlarged insulator. The positive electrode 11 and the negative electrode 12 are net-like members in which a plurality of linear portions 16 intersects with one another. The portion surrounded by the plurality of linear portions 16 serves as the openings 11H and 12H of the positive electrode 11 and the negative electrode 12. In the present embodiment, the openings 11H and 12H included in the positive electrode 11 and the negative electrode 12 have a rhombic shape. In the openings 11H and 12H, one diagonal line (first diagonal line) TL1 is longer than the other diagonal line (second diagonal line) TLs. In the openings 11H and 12H, angles in apexes Pa and Pb on the first diagonal line TL1 are smaller than angles in apexes Pc and Pd on the second diagonal line TLs.

Since the positive electrode 11 and the negative electrode 12 include the plurality of openings 11H and 12H, lines of electric force can be provided to an inside and to an outside through the openings 11H and 12H. Therefore, both surface of the positive electrode 11 and the negative electrode 12 can be used for electrolysis, and thus hydrogen can be efficiently generated. Further, the negative electrode 12 can cause a wet angle of the bubbles of hydrogen generated by the negative electrode 12 itself to be small, with the opening 12H surrounded by the linear portions 16, and thus can cause the bubbles of hydrogen to be separated in a small state. That is, absorption power caused between the generated hydrogen and a surface of the negative electrode 12 almost becomes in a point contact state, and surface tension is suppressed. Therefore, as a result, the negative electrode 12 can cause the bubbles of hydrogen to be separated in a small state, and can generate the hydrogen-containing water in which a large amount of hydrogen is dissolved.

In the present embodiment, cross sections of the linear portions 16 of the positive electrode 11 and the negative electrode 12 have a rectangular shape (a square shape in the example of FIG. 14), as illustrated in FIG. 14. The negative electrode 12 can cause the wet angle of the bubbles of hydrogen to be smaller with corners 16T in the linear portion 16 to suppress the surface tension, and thus can cause the bubbles of hydrogen to be separated in a smaller state. Therefore, the negative electrode 12 can generate hydrogen water in which smaller bubbles of hydrogen are dissolved. Further, the negative electrode 12 includes the linear portion 16 with a rectangular cross section, and thus can cause a surface area that can be used for generation of hydrogen to be large. According to these functions, efficiency to dissolve hydrogen in the raw water of the negative electrode 12 is improved.

In the present embodiment, in the openings 11H and 12H, the first diagonal line TL1 extends in the direction in which the positive electrode 11 and the negative electrode 12 extend, that is, in the longitudinal direction E, as illustrated in FIG. 13. The second diagonal line TLs extends in the circumferential direction C of the positive electrode 11 and the negative electrode 12 having a cylindrical shape. The positive electrode 11 and the negative electrode 12 include the end-portion-side opening portions 10HA and 10HB in both sides in the longitudinal direction E, as illustrated in FIGS. 1 and 2. The bubbles of oxygen generated inside the positive electrode 11 are released through the end-portion-side opening portion 10HA, 10HB to the outside of the hydrogen-containing water generating electrode 10, as illustrated in FIG. 3. At this time, since the longitudinal direction of the opening 11H of the positive electrode 11 accords with the direction in which the bubbles of oxygen are moved. Therefore, the bubbles of oxygen can be easily moved to the end-portion-side opening portions 10HA and 10HB. As a result, the hydrogen-containing water generating electrode 10 can efficiently release the bubbles of oxygen to the outside. Further, in the opening 11H of the positive electrode 11, angles of the apexes Pa and Pb on the first diagonal line TL1 are acute angles. Therefore, the contact area between the bubbles of oxygen, and the linear portion 16 can be made small. As a result, the bubbles of oxygen can be easily separated from the linear portion 16. Therefore, the hydrogen-containing water generating electrode 10 can efficiently release the bubbles of oxygen to the outside. Further, in the positive electrode 11, the linear portion 16 includes the corners 16T, the wet angle of the bubbles of oxygen can be made smaller with the corners 16T, and the surface tension can be suppressed. As a result, the positive electrode 11 can cause the bubbles of oxygen to be promptly separated from the linear portion 16, and moved to the end-portion-side opening portions 10HA and 10HB. Therefore, the hydrogen-containing water generating electrode 10 can efficiently release the bubbles of oxygen to the outside. Further, in the process in which the bubbles of oxygen are moved along the inside of the positive electrode 11, the bubbles take in bubbles of oxygen newly generated on the positive electrode 11 side, and grow. Therefore, the contact area between the bubbles of oxygen, and the raw water W can be made small, and dissolving of oxygen to the raw water W can be suppressed.

As illustrated in FIG. 15, the insulator 13 is a net-like member in which a plurality of linear members 17 intersect with one another, and a portion surrounded by the linear members 17 is the opening 13H. The opening 13H has a rectangular shape (a square shape in the present embodiment). The length of one side is La, and the length of a side adjacent to the side of La is Lb in the opening 13H. In the present embodiment, the opening 13H has a square shape, and thus La=Lb. The side having the length of La is parallel to the longitudinal direction E of the positive electrode 11 and the negative electrode 12, and the side having the length of Lb is parallel to the circumferential direction C of the positive electrode 11 and the negative electrode 12 having a cylindrical shape.

In the present embodiment, the opening 11H of the positive electrode 11 and the opening 12H of the negative electrode 12 are larger than the opening 13H of the insulator 13. The area of the openings 11H and 12H is Ll×Ls/2 where the length of the first diagonal line TL1 is Ll, and the length of the second diagonal line TLs is Ls. The area (opening area) of the opening 13H is La×Lb. Therefore, Ll×Ls/2>La×Lb is satisfied. In the present embodiment, for example, the length Ll of the first diagonal line TL1 is 6 mm, the length Ls of the second diagonal line TLs is 3 mm. Therefore, the area of the openings 11H and 12H is 9 mm². In the opening 13H, La=Lb=1.06 mm, for example. Therefore, twenty four openings 13H per inch are arrayed in the insulator 13. The area (opening area) of the opening 13H becomes 1.12 mm². As described above, in the present embodiment, the area of the openings 11H and 12H of the positive electrode 11 and the negative electrode 12 is about eight times the area of the opening 13H.

When the opening 13H of the insulator 13 is larger than the openings 11H and 12H of the positive electrode 11 and the negative electrode 12, a possibility that the positive electrode 11 and the negative electrode 12 come in contact with each other through the opening 13H of the insulator 13 becomes high. The hydrogen-containing water generating electrode 10 can avoid the mutual contact of the positive electrode 11 and the negative electrode 12 through the opening 13H of the insulator 13, by causing the opening 13H of the insulator 13 to be smaller than the openings 11H and 12H of the positive electrode 11 and the negative electrode 12. In this way, the hydrogen-containing water generating electrode 10 can avoid short-circuit of the positive electrode 11 and the negative electrode 12, and can secure insulation of these electrodes, even if the distance between the positive electrode 11 and the negative electrode 12 is made small. Therefore, the hydrogen-containing water generating electrode 10 is suitable for the system being put in the raw water W, which is required to suppress the voltage applied to the positive electrode 11 and the negative electrode 12 to be low.

In the present embodiment, the insulator 13 is a net-like member in which the plurality of linear members 17 intersects with one another. When such a net-like member is used as the insulator 13, the insulator 13 is allowed to have deformation in the thickness direction to some extent. Therefore, when the hydrogen-containing water generating electrode 10 is subject to vibration or impact, the insulator 13 can absorb the vibration or the impact. If the net-like member in which the plurality of linear members 17 intersect with one another is used as the insulator 13, the insulator 13 is suitable for the portable hydrogen-containing water generating electrode 10, which can be moved and carried.

In the hydrogen-containing water generating electrode 10, the opening 13H of the insulator 13 is smaller than the openings 11H and 12H of the positive electrode 11 and the negative electrode 12. Therefore, the bubbles of oxygen generated on the positive electrode 11 side are captured with the linear members 17 of the insulator 13, and large bubbles can be made. When the bubbles of oxygen become large, dissolving of oxygen to the raw water W is suppressed. Therefore, the hydrogen-containing water generating electrode 10 can generate the hydrogen-containing water having a high dissolution ratio of the bubbles of hydrogen. Further, when the bubbles of oxygen become large, buoyancy becomes large. As a result, the bubbles of oxygen can be easily moved inside the positive electrode 11, and can easily pass through the opening 13H. Therefore, the hydrogen-containing water generating electrode 10 can easily release the bubbles of oxygen from the inside.

Further, the bubbles of oxygen not captured with the linear members 17 pass through the opening 13H of the insulator 13, and take the bubbles of hydrogen adhering to the linear portions 16 of the negative electrode 12 and separate the bubbles of hydrogen from the linear portions 16. Therefore, the hydrogen-containing water generating electrode 10 can promptly separate the bubbles of hydrogen, which are generated at the negative electrode 12, from the negative electrode 12, and can cause the bubbles of hydrogen to be dissolved in the raw water W. Next, a method of manufacturing the hydrogen-containing water generating electrode 10 will be described.

<Method of Manufacturing Hydrogen-Containing Water Generating Electrode>

Figure 16:
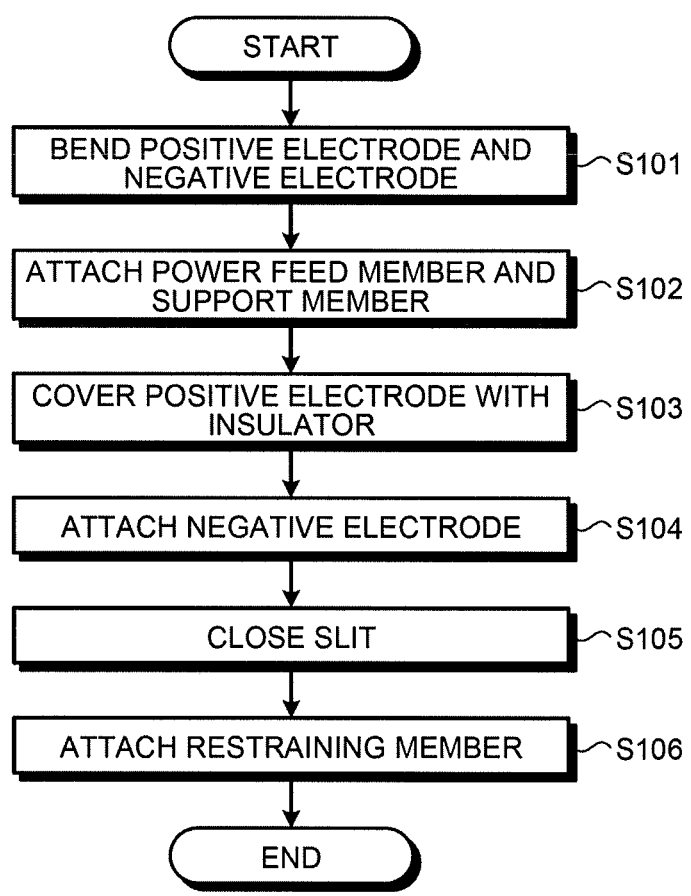
FIG. 16 is a flowchart of a method of manufacturing the hydrogen-containing water generating electrode according to the present embodiment.
Figure 17:
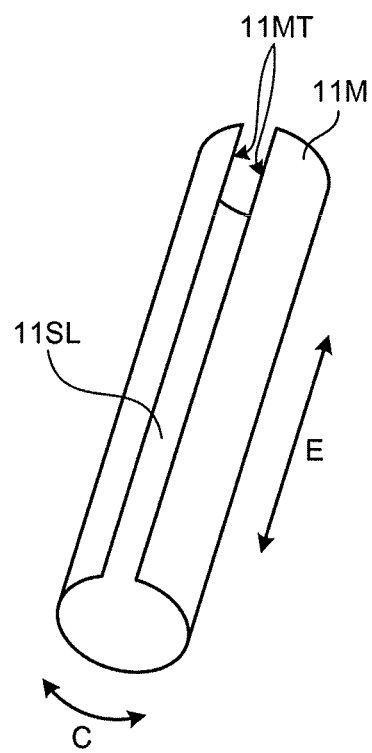
FIG. 17 is a diagram illustrating a step of the method of manufacturing the hydrogen-containing water generating electrode according to the present embodiment.
Figure 18:
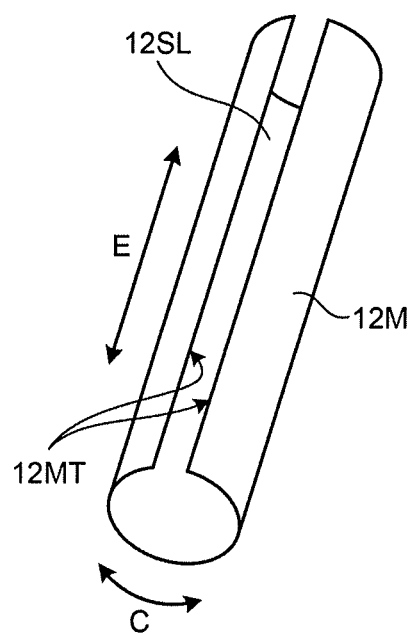
FIG. 18 is a diagram illustrating a step of the method of manufacturing the hydrogen-containing water generating electrode according to the present embodiment.

FIG. 16 is a flowchart of a method of manufacturing the hydrogen-containing water generating electrode according to the present embodiment. FIGS. 17 to 26 are diagrams illustrating respective steps of the method of manufacturing the hydrogen-containing water generating electrode according to the present embodiment. In manufacturing the hydrogen-containing water generating electrode 10, first, at step S101, as illustrated in FIGS. 17 and 18, a positive electrode material 11M and a negative electrode material 12M as conductors are bent to form members having an approximately cylindrical shape. The positive electrode material 11M and the negative electrode material 12M are plate-like conductors having a plurality of openings (corresponding to the opening 11H of the positive electrode 11 and the opening 12H of the negative electrode 12 illustrated in FIG. 4 and other figures, and omitted in FIGS. 17 and 18). The members having an approximately cylindrical shape, which are the bent positive electrode material 11M and negative electrode material 12M, have the slits 11SL and 12SL that are each a removed portion in a circumferential direction C and extend in the longitudinal direction E, that is, in a direction in which the members having an approximately cylindrical shape extend. As illustrated in FIG. 17, the slit 11SL is formed between facing end portions 11MT and 11MT of the positive electrode material 11M. As illustrated in FIG. 18, the slit 12SL is formed between facing end portions 12MT and 12MT of the negative electrode material 12M.

Figure 19:
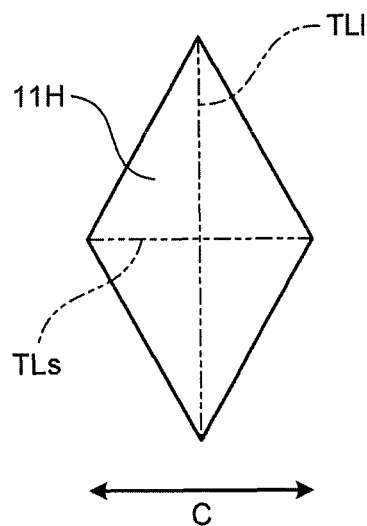
FIG. 19 is a diagram illustrating a step of the method of manufacturing the hydrogen-containing water generating electrode according to the present embodiment.

The longitudinal direction E of the positive electrode material 11M is parallel to the first diagonal line TL1 of the opening 11H of the positive electrode material illustrated in FIG. 19. The first diagonal line TL1 of the opening 11H is longer than the second diagonal line TLs. Therefore, in the opening 11H illustrated in FIG. 19, the second diagonal line TLs shorter than the first diagonal line TL1 extends in the circumferential direction C of the member having an approximately cylindrical shape that is the bent positive electrode material 11M. As a result, the positive electrode material 11M can be easily bent in a cylindrical manner, and dimension accuracy of the positive electrode 11 can be easily secured.

Figure 20:
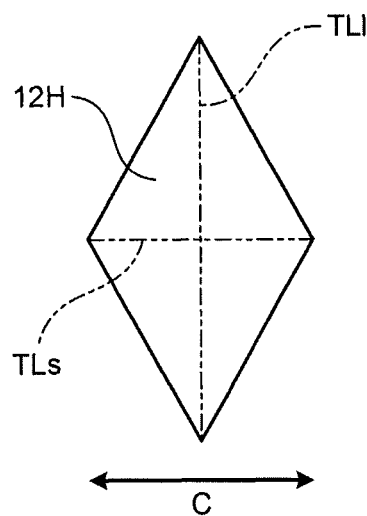
FIG. 20 is a diagram illustrating a step of the method of manufacturing the hydrogen-containing water generating electrode according to the present embodiment.

The longitudinal direction E of the negative electrode material 12M is parallel to the first diagonal line TL1 of the opening 12H of the negative electrode material illustrated in FIG. 20. The first diagonal line TL1 of the opening 12H is longer than the second diagonal line TLs. Therefore, in the opening 12H illustrated in FIG. 20, the second diagonal line TLs shorter than the first diagonal line TL1 extends in the circumferential direction C of the member having an approximately cylindrical shape that is the bent negative electrode material 12M. As a result, the negative electrode material 12M can be easily bent in a cylindrical manner, and dimension accuracy of the negative electrode 12 can be easily secured.

Figure 21:
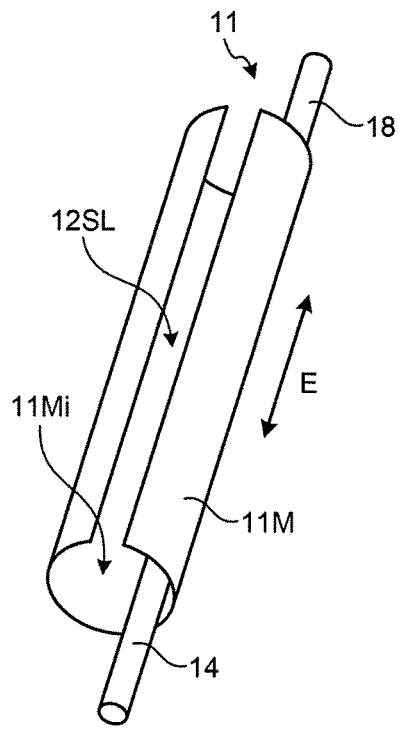
FIG. 21 is a diagram illustrating a step of the method of manufacturing the hydrogen-containing water generating electrode according to the present embodiment.
Figure 22:
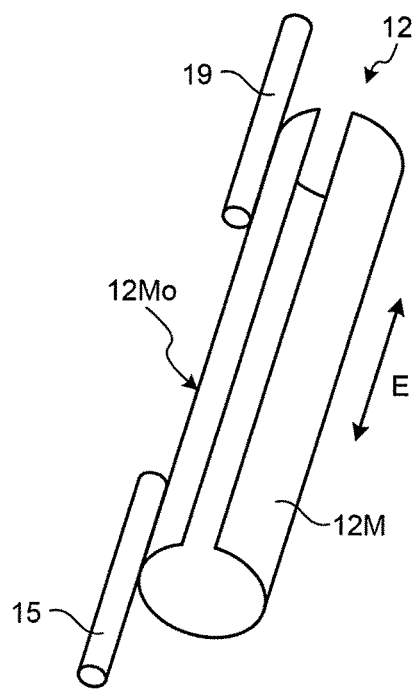
FIG. 22 is a diagram illustrating a step of the method of manufacturing the hydrogen-containing water generating electrode according to the present embodiment.

Next, at step S102, a power feed member and a support member are mounted to each of the positive electrode material 11M and the negative electrode material 12M bent in the cylindrical shape (see FIGS. 21 and 22). The power feed member is the positive-electrode power feed member 14 illustrated in FIG. 21 and the negative-electrode power feed member 15 illustrated in FIG. 22. The support member is the positive-electrode support member 18 illustrated in FIG. 21 and the negative-electrode support member 19 illustrated in FIG. 22.

As illustrated in FIG. 21, the positive-electrode power feed member 14 and the positive-electrode support member 18 are mounted to an inner side surface 11Mi of the bent positive electrode material 11M. The positive-electrode power feed member 14 and the positive-electrode support member 18 are connected and mounted to the positive electrode material 11M such that the longitudinal direction becomes parallel to the first diagonal line TL1 of the opening 11H illustrated in FIG. 19. The positive-electrode power feed member 14 and the positive-electrode support member 18 are joined with the positive electrode material 11M by welding, for example. Therefore, the positive-electrode power feed member 14 and the positive electrode material 11M are electrically connected.

As illustrated in FIG. 22, the negative-electrode power feed member 15 and the negative-electrode support member 19 are mounted to an outer side surface 12Mo of the bent negative electrode material 12M. The negative-electrode power feed member 15 and the negative-electrode support member 19 are connected and mounted to the negative electrode material 12M such that the longitudinal direction becomes parallel to the first diagonal line TL1 of the opening 12H illustrated in FIG. 20. The negative-electrode power feed member 15 and the negative-electrode support member 19 are joined with the negative electrode material 12M by welding, for example. Therefore, the negative-electrode power feed member 15 and the negative electrode material 12M are electrically connected.

The positive electrode material 11M to which the positive-electrode power feed member 14 and the positive-electrode support member 18 are mounted, and the negative electrode material 12M to which the negative-electrode power feed member 15 and the negative-electrode support member 19 are mounted are subjected to plating (platinum plating in the present embodiment). When plating is not applied to the negative electrode 12, plating is applied to only the positive electrode material 11M to which the positive-electrode power feed member 14 and the positive-electrode support member 18 are mounted. In this way, the positive electrode 11 and the negative electrode 12 are completed. Both of the positive electrode 11 and the negative electrode 12 are a tubular conductor, include a plurality of openings in a side portion, and include the slit 11SL and 12SL that are each a removed portion in the circumferential direction and extend in the longitudinal direction E, that is, in the direction in which the tubular conductors extend.

Figure 23:
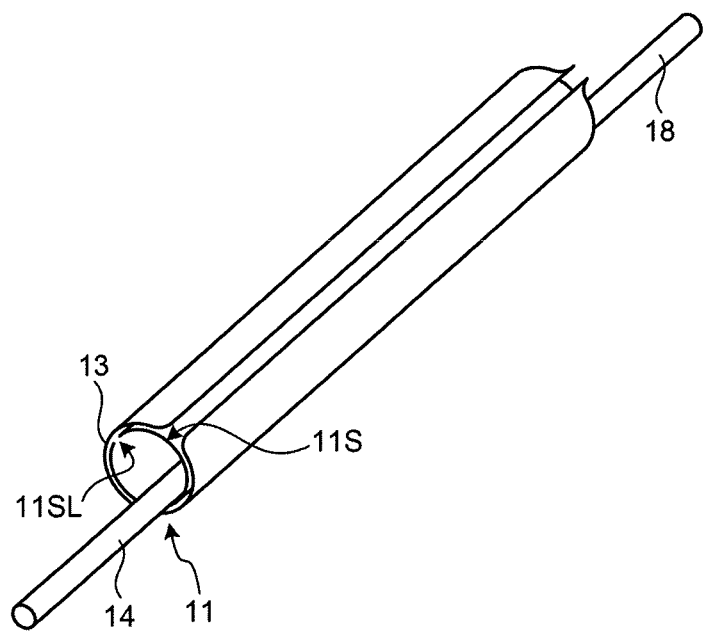
FIG. 23 is a diagram illustrating a step of the method of manufacturing the hydrogen-containing water generating electrode according to the present embodiment.

Next, the process proceeds to step S103, as illustrated in FIG. 23, a side portion 11S of the positive electrode 11 that is a tubular conductor and has a plurality of openings 11H in the side portion 11S is covered with the net-like insulator 13. In covering the side portion 11S of the positive electrode 11 with the insulator 13, the position of the slit 11SL is not especially limited.

Figure 24:
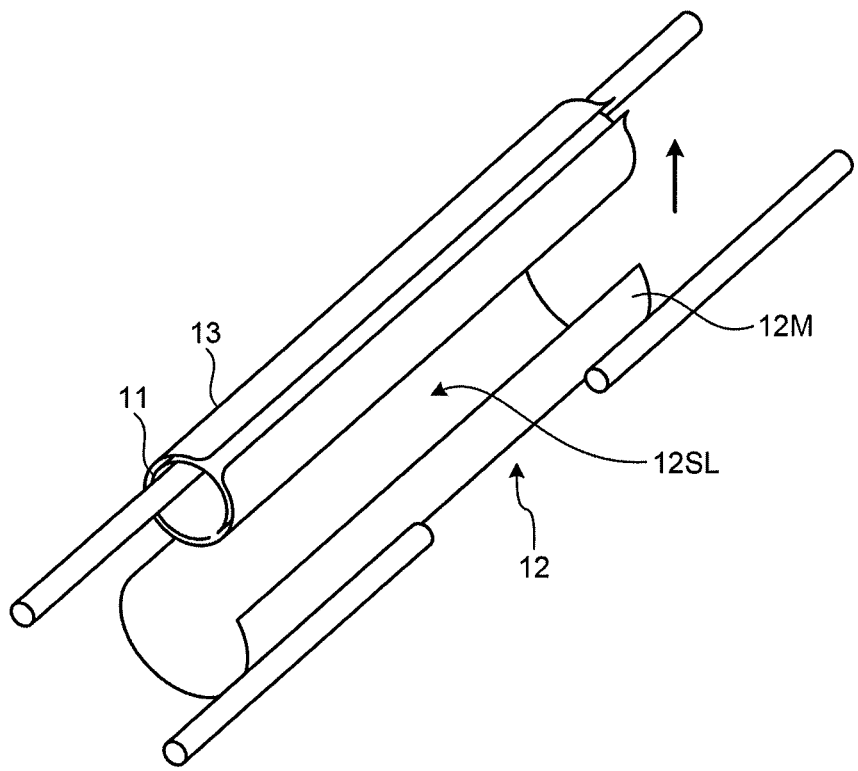
FIG. 24 is a diagram illustrating a step of the method of manufacturing the hydrogen-containing water generating electrode according to the present embodiment.

Next, at step S104, as illustrated in FIG. 24, the positive electrode 11 and the insulator 13 are passed through the slit 12SL, and the negative electrode 12 is mounted to an outside of the insulator 13. When the positive electrode 11 and the insulator 13 are passed through the slit 12SL of the negative electrode 12, the slit 12SL is enlarged. When the positive electrode 11 and the insulator 13 are arranged inside the negative electrode 12, at step S105, the enlarged slit 12SL is closed.

Figure 25:
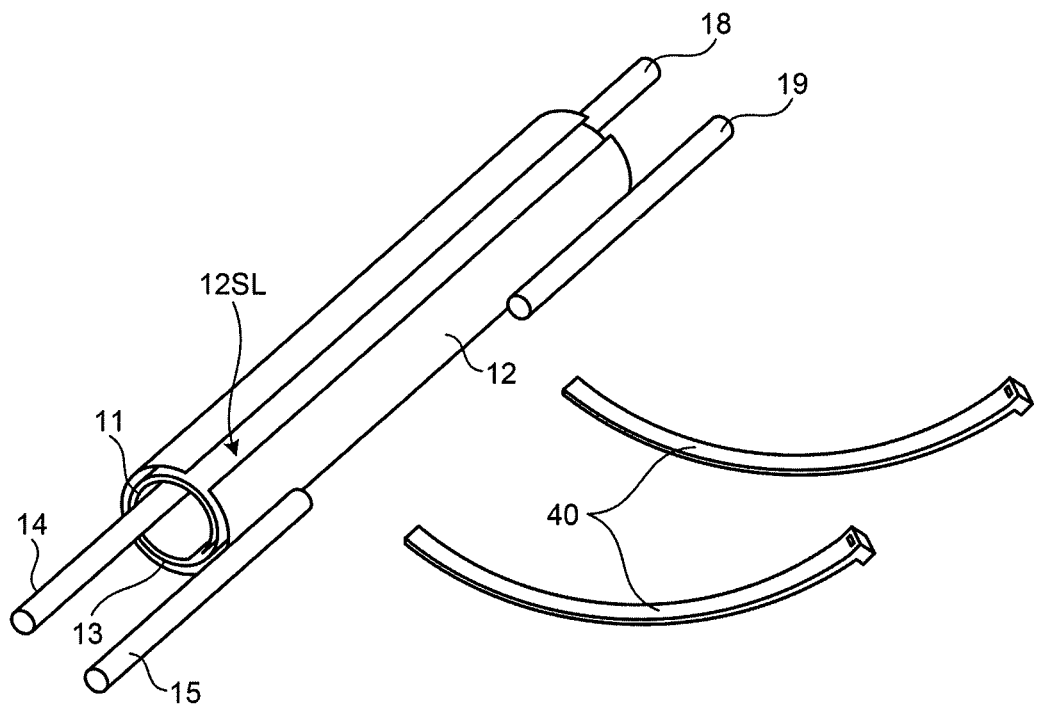
FIG. 25 is a diagram illustrating a step of the method of manufacturing the hydrogen-containing water generating electrode according to the present embodiment.
Figure 26:
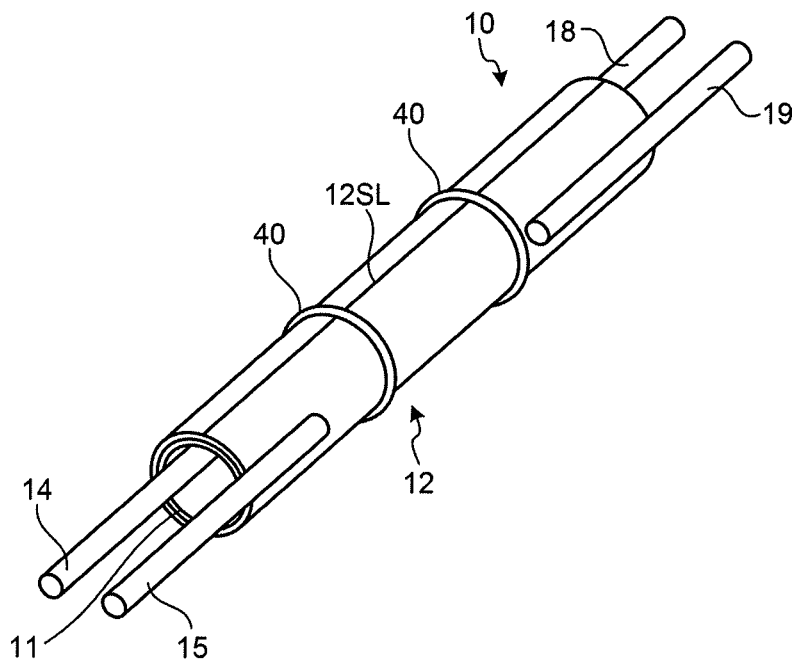
FIG. 26 is a diagram illustrating a step of the method of manufacturing the hydrogen-containing water generating electrode according to the present embodiment.

Following that, at step S106, as illustrated in FIG. 25, the restraining members 40 are mounted to an outside of the negative electrode 12, and restrains the negative electrode 12, the insulator 13, and the positive electrode 11. The plurality of restraining members 40 is mounted between the negative-electrode power feed member 15 and the negative-electrode support member 19. As the restraining members 40, for example, a resin cable tie or a metal line material having high corrosion resistance and not dissolved in the raw water W can be used. The negative electrode 12, the insulator 13, and the positive electrode 11 are restrained by the restraining members 40, so that the hydrogen-containing water generating electrode 10 is completed, as illustrated in FIG. 26. An excess insulator 13 may be taken out through the closed slit 12SL to an outside of the negative electrode 12.

Force toward the circumferential direction is provided to the negative electrode 12 and the positive electrode 11 that are the members having a cylindrical shape by the restraining members 40. Therefore, the slit 11SL of the positive electrode 11 and the slit 12SL of the negative electrode 12 are closed. The positive electrode 11 is a conductor and is an elastic body, and deformation to close the slit 11SL is deformation within a range of elastic deformation of the material of the positive electrode 11. Therefore, when the slit 11SL of the positive electrode 11 is closed, force to open the closed slit 11SL is caused in the positive electrode 11.

Since the positive electrode 11 is restrained by the restraining members 40 through the negative electrode 12, the force caused in the positive electrode 11 acts to press the positive electrode 11 and the insulator 13 to the negative electrode 12. As a result, the insulator 13 is reliably in contact with the positive electrode 11 and the negative electrode 12, and the gap formed between the positive electrode 11 and the negative electrode 12 is accurately defined by the thickness of the insulator 13. Further, deviation between the positive electrode 11, the insulator 13, and the negative electrode 12 are suppressed by the force caused in the positive electrode 11. In this way, the hydrogen-containing water generating electrode 10 used in a portable device can be manufactured.

The method of manufacturing a hydrogen-containing water generating electrode according to the present embodiment does not use joining such as welding except that the power feed member and the support member are mounted to the positive electrode material 11M and the negative electrode material 12M. Therefore, the hydrogen-containing water generating electrode 10 can be easily disassembled into the positive electrode 11, the negative electrode 12, and the insulator 13 by removing the restraining members 40. Therefore, maintenance, inspection, repair, and part replacement can be easily performed. Further, recycling of the hydrogen-containing water generating electrode 10 is also easy. Next, a hydrogen-containing water generating device including the hydrogen-containing water generating electrode 10 will be described.

<Hydrogen-Containing Water Generating Device>

Figure 27:
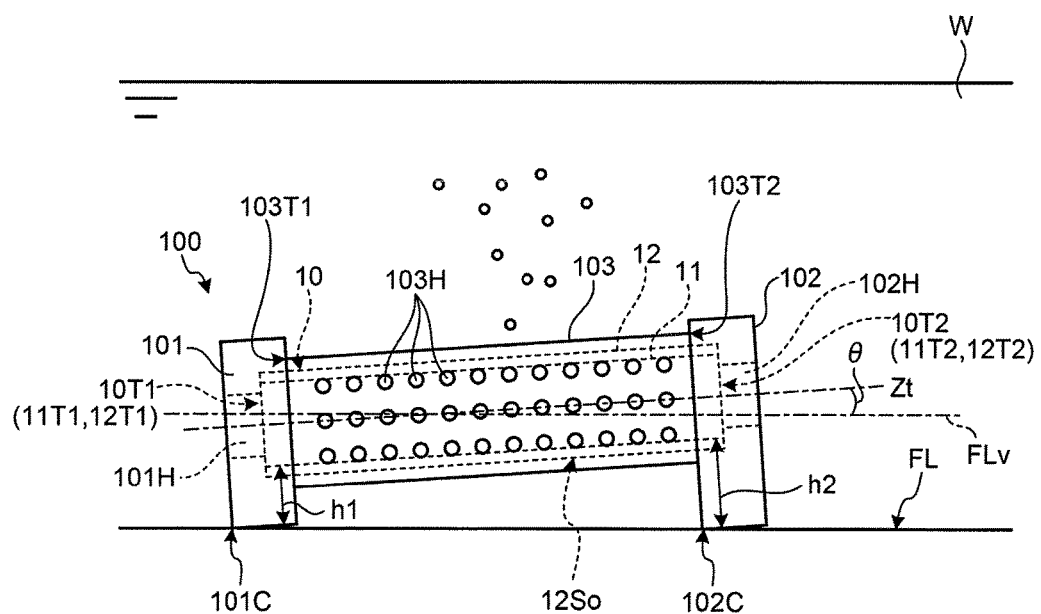
FIG. 27 is a diagram illustrating a hydrogen-containing water generating device according to the present embodiment.
Figure 28:
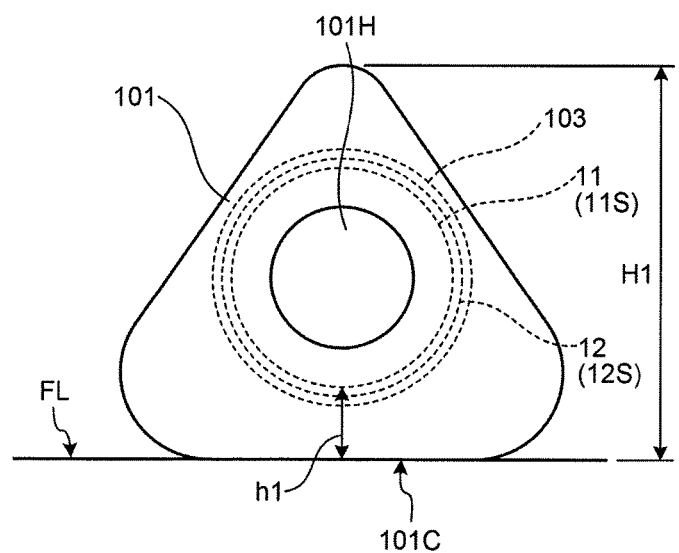
FIG. 28 is a diagram illustrating a first support included in the hydrogen-containing water generating device according to the present embodiment.
Figure 29:
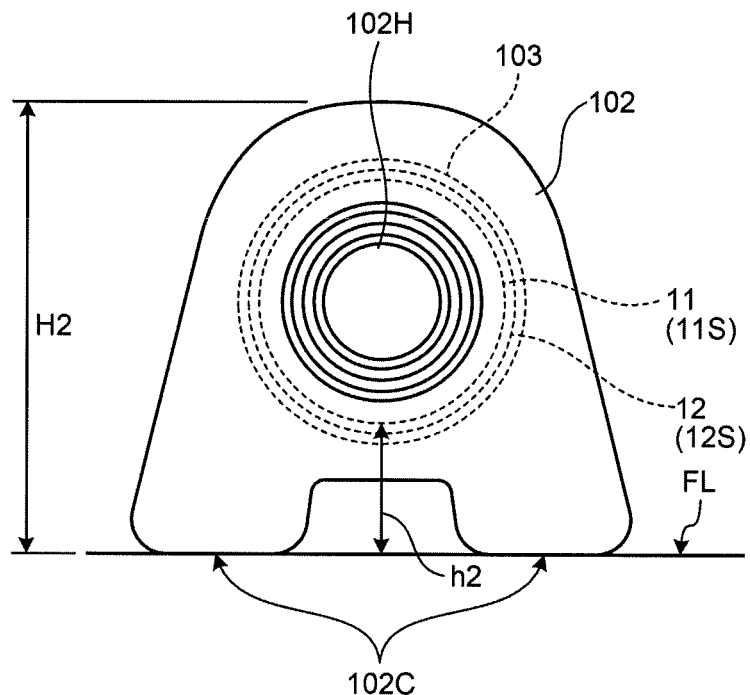
FIG. 29 is a diagram illustrating a second support included in the hydrogen-containing water generating device according to the present embodiment.
Figure 30:
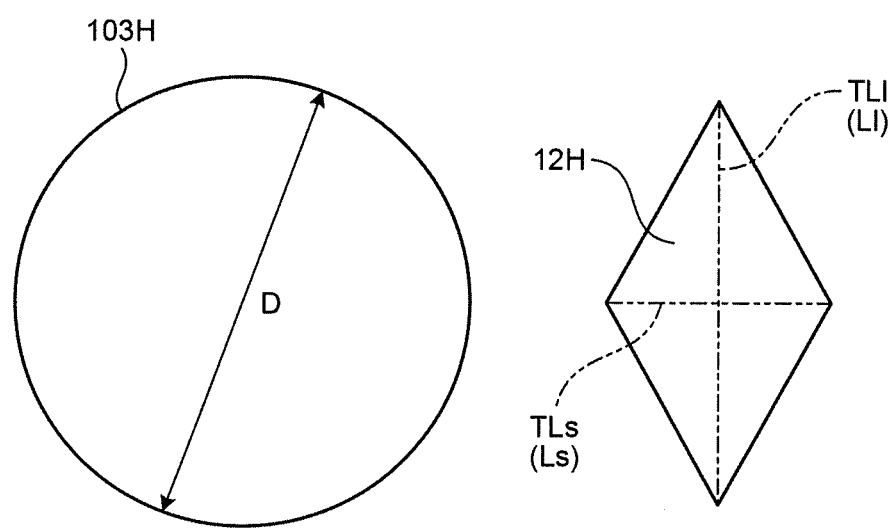
FIG. 30 is a diagram illustrating an opening of a protection member and an opening of a negative electrode included in the hydrogen-containing water generating device according to the present embodiment.

FIG. 27 is a diagram illustrating a hydrogen-containing water generating device according to the present embodiment. FIG. 28 is a diagram illustrating a first support included in the hydrogen-containing water generating device according to the present embodiment. FIG. 29 is a diagram illustrating a second support included in the hydrogen-containing water generating device according to the present embodiment. FIG. 30 is a diagram illustrating an opening of a protection member and an opening of a negative electrode included in the hydrogen-containing water generating device according to the present embodiment. A hydrogen-containing water generating device 100 is a device that includes the above-described hydrogen-containing water generating electrode 10, puts in the raw water W, and generates the hydrogen-containing water.

The hydrogen-containing water generating device 100 includes a first support 101, a second support 102, and the hydrogen-containing water generating electrode 10. In the present embodiment, the hydrogen-containing water generating device 100 further includes a protection member 103. The first support 101 is mounted to a first end portion 10T1 side of the hydrogen-containing water generating electrode 10. The first support 101 includes a first installation portion 101C that comes in contact with the installing object FL of the hydrogen-containing water generating device 100. The installing object FL is, for example, a bottom portion of a bath or a bottom portion of a drinking water tank. In the present embodiment, the first installation portion 101C is a side portion around the central axis Zt of the hydrogen-containing water generating electrode 10, of side portions of the first support 101.

The second support 102 is mounted to a second end portion 10T2 side of the hydrogen-containing water generating electrode 10. The second support 102 includes a second installation portion 102C that comes in contact with the installing object FL. In the present embodiment, the second installation portion 102C is a side portion around the central axis Zt of the hydrogen-containing water generating electrode 10, of side portions of the second support 102. A distance (second-support-side height) h2 of the second support 102 from the side portion 11S of the positive electrode 11 to the second installation portion 102C in a direction perpendicular to the side portion 11S of the positive electrode 11 included in the hydrogen-containing water generating electrode 10 is larger than a distance (first-support-side height) h1 from the side portion 11S of the positive electrode 11 to the first installation portion 101C in the direction perpendicular to the side portion 11S of the positive electrode 11. Therefore, a height H1 of the first support 101 illustrated in FIG. 28 is smaller than a height H2 of the second support 102 illustrated in FIG. 29. In this example, both of the first-support-side height h1 and the second-support-side height h2 are based on portions installed on the installing object FL.

The first end portion 10T1 of the hydrogen-containing water generating electrode 10 corresponds to the first end portions 11T1 and 12T1 of the positive electrode 11 and the negative electrode 12 illustrated in FIG. 4 and other figures, and the second end portion 10T2 corresponds to the second end portions 11T2 and 12T2 of the positive electrode 11 and the negative electrode 12. A direction perpendicular to a side portion 12S of the negative electrode 12 corresponds to the direction perpendicular to the central axis Zt of the hydrogen-containing water generating electrode 10. The first support 101 and the second support 102 are manufactured by molding a resin, for example. The first support 101 and the second support 102 support the hydrogen-containing water generating electrode 10 when being installed on the installing object FL.

The protection member 103 is a tubular (a cylindrical shape in the present embodiment) member, and includes a plurality of openings 103H in the side portion. The plurality of openings 103H included in the protection member 103 penetrates the side portion of the protection member 103 in the thickness direction of the protection member 103. The protection member 103 is provided outside the hydrogen-containing water generating electrode 10, to be specific, outside the negative electrode 12. A first end portion 103T1 of the protection member 103 is supported by the first support 101, and a second end portion 103T2 is supported by the second support 102. With such a structure, the hydrogen-containing water generating electrode 10 and the protection member 103 are supported by the first support 101 and the second support 102 at both end portion sides.

The protection member 103 is provided outside the hydrogen-containing water generating electrode 10, and protects the hydrogen-containing water generating electrode 10. Further, the protection member 103 is put in the raw water W and is in contact with the raw water W at the time of use of the hydrogen-containing water generating device 100. Therefore, the protection member 103 is made of stainless steel or the like having high strength and corrosion resistance. The protection member 103 mounted to the first support 101 and the second support 102 has strength of some extent to protect the hydrogen-containing water generating electrode 10. Therefore, the protection member 103 also functions as a structure member for securing the strength of the hydrogen-containing water generating device 100 together with the first support 101 and the second support 102.

As illustrated in FIGS. 27 and 28, the first support 101 includes a first opening portion 101H as an opening portion connected with a space surrounded by the side portion of the positive electrode 11. As illustrated in FIGS. 27 and 29, the second support 102 includes a second opening portion 102H as an opening portion connected with a space surrounded by the side portion of the positive electrode 11. The first opening portion 101H and the second opening portion 102H connect an inner portion of the positive electrode 11 of the hydrogen-containing water generating electrode 10 and an outside, and serve as a passage of bubbles of oxygen generated on the positive electrode 11 side. At least one of the first support 101 and the second support 102 may have the opening portion connected with the space surrounded by the side portion of the positive electrode 11.

As described above, by causing the second-support-side height h2 to be larger than the first-support-side height h1, the hydrogen-containing water generating electrode 10 is inclined with respect to a ground plane of the installing object FL such that, toward the second support 102 from the first support 101, the distance from the installing object FL becomes large. The positive electrode 11 of the hydrogen-containing water generating electrode 10 has a tubular shape, and the shape of a cross section perpendicular to the central axis Zt is constant in a direction parallel to the central axis Zt. Therefore, the positive electrode 11, especially, the inside of the positive electrode 11 of the side separated from the first installation portion 101C and the second installation portion 102C (an upper inside of the positive electrode) is inclined such that, toward the second support 102 from the first support 101, the distance from the installing object FL becomes large.

By causing the positive electrode 11 and the upper inside of the positive electrode of the positive electrode 11 in hydrogen-containing water generating device 100 to be inclined as described above, the bubbles of oxygen generated on the positive electrode 11 side are gathered to an upper side of the positive electrode 11. Then, the bubbles of oxygen are moved toward the second opening portion 102H of the second support 102 along the upper inside of the positive electrode due to influence of buoyancy, and are released to the outside of the hydrogen-containing water generating device 100, to be specific, to the outside of the hydrogen-containing water generating electrode 10. As described above, in the hydrogen-containing water generating device 100, the positive electrode 11 is inclined so as to be away from the ground plane of the installing object FL toward the second opening portion 102H, and thus can efficiently and promptly release the bubbles of oxygen in the positive electrode 11 through the second opening portion 102H to the outside, using the buoyancy of the bubbles of oxygen. Therefore, the hydrogen-containing water generating device 100 can release the bubbles of oxygen in the positive electrode 11 to the outside even if there is no passing water to the hydrogen-containing water generating electrode 10.

An angle (angle of inclination) formed by the hydrogen-containing water generating electrode 10 and the ground plane of the installing object FL is θ. In the present embodiment, the angle of inclination θ is an angle formed by a virtual ground plane FLv parallel to the ground plane of the installing object FL, and the central axis Zt of the hydrogen-containing water generating electrode 10, for convenience. The angle of inclination θ is preferably 0.5 degrees or more from a perspective of efficient release of the bubbles of oxygen to the outside of the hydrogen-containing water generating electrode 10, more preferably 1 degree or more, and still more preferably 1.5 degrees or more. If the angle of inclination θ falls within these ranges, the hydrogen-containing water generating device 100 can efficiently and promptly release the bubbles in the hydrogen-containing water generating electrode 10.

If the angle of inclination θ is made large, the bubbles of oxygen generated in the positive electrode 11 are released into the raw water before being united and becoming a sufficient size. As a result, if the angle of inclination θ is large, the amount of oxygen dissolved in the raw water tends to be increased. The angle is preferably 5 degrees or less from a perspective of suppression of the amount of oxygen dissolved in the raw water, more preferably 4 degrees or less, still more preferably 3 degrees or less. If the angle of inclination θ falls within these ranges, the hydrogen-containing water generating device 100 can suppress the amount of oxygen dissolved in the raw water. Further, if the angle of inclination θ falls within these ranges, an excessive increase in the height of the hydrogen-containing water generating device 100, to be specific, the height H2 of the second support 102 illustrated in FIG. 27 can be suppressed, and the hydrogen-containing water generating device 100 can be made compact. The angle of inclination θ is preferably from 0.5 to 5 degrees, both inclusive, more preferably from 1 to 4 degrees, both inclusive, and still more preferably from 1.5 to 3 degrees, both inclusive. In the present embodiment, the angle of inclination θ is 2 degrees.

The hydrogen-containing water generating device 100 includes the first opening portion 101H in the first support 101, and the second opening portion 102H in the second support 102. Therefore, the hydrogen-containing water generating electrode 10 can be washed from at least one of the first opening portion 101H and the second opening portion 102H. For example, dirt and the like of the hydrogen-containing water generating electrode 10, especially, of the positive electrode 11 can be removed by jetting rinse water to the hydrogen-containing water generating electrode 10 with a hose or the like through the first opening portion 101H, or by inserting a brush or the like through the first opening portion 101H. As described above, the hydrogen-containing water generating device 100 includes the first opening portion 101H and the second opening portion 102H, and thus enables work in washing the hydrogen-containing water generating electrode 10 to become easy. Other than the washing with water, minerals deposited on the surfaces of the positive electrode 11 and the negative electrode 12 of the hydrogen-containing water generating electrode 10 are removed by immersing the hydrogen-containing water generating device 100 in a cleaning solution (for example, an aqueous solution of citric acid) for a predetermined time. In this way, it is not necessary to supply the water or the cleaning solution used for washing separately from the raw water W, the hydrogen-containing water generating electrode 10 can be of a simple structure. Note that the hydrogen-containing water generating device 100 can obtain the above-described functions and effects as long as including at least one of the first opening portion 101H and the second opening portion 102H. Next, a relationship between the opening 103H of the protection member 103 and the opening 12H of the negative electrode 12 will be described.

In the present embodiment, as illustrated in FIG. 30, the shape of the opening 103H of the protection member 103 is a circle with a diameter of D. The opening 103H of the protection member 103 is larger than the opening 12H of the negative electrode 12. To be specific, the area of the opening 103H is $\pi \times D^2/4$, and the area of the opening 12H is $Ll \times Ls/2$, and thus $\pi \times D^2/4 > Ll \times Ls/2$ is satisfied. In doing so, the bubbles of hydrogen generated on the negative electrode 12 side can efficiently pass through the opening 103H of the protection member 103, and can be efficiently dissolved in the raw water W. The opening 103H of the protection member 103 is formed into a circular shape, so that the opening 103H can be easily manufactured.

Figure 31:
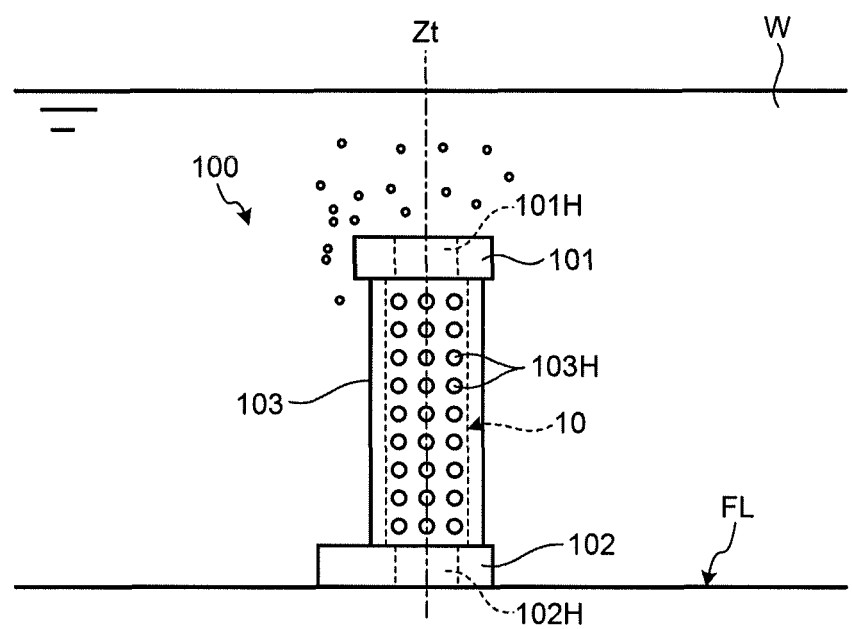
FIG. 31 is a diagram illustrating another use state of the hydrogen-containing water generating device according to the present embodiment.

FIG. 31 is a diagram illustrating another use state of the hydrogen-containing water generating device according to the present embodiment. The hydrogen-containing water generating device 100 may be installed so that the second opening portion 102H side of the second support 102 faces the installing object FL. Alternatively, the hydrogen-containing water generating device 100 may be installed so that the first opening portion 101H side of the first support 101 faces the installing object FL. In doing so, the central axis Zt of the hydrogen-containing water generating electrode 10 becomes perpendicular to the ground plane of the installing object FL. The bubbles of oxygen generated on the positive electrode 11 side of the hydrogen-containing water generating electrode 10 are released into the raw water W through the first opening portion 101H of the first support 101 arranged at an opposite side to the installing object FL. When the hydrogen-containing water generating device 100 is installed so that the first opening portion 101H side of the first support 101 faces the installing object FL, the bubbles of oxygen generated on the positive electrode 11 side of the hydrogen-containing water generating electrode 10 are released into the raw water W through the second opening portion 102H of the second support 102.

The bubbles of hydrogen generated on the negative electrode 12 side of the hydrogen-containing water generating electrode 10 are released from the entire circumference of the negative electrode 12 into the raw water W, and pass through the opening 103H of the protection member 103. In this way, both of the first support 101 and the second support 102 of the hydrogen-containing water generating device 100 may be installed on the installing object FL, or only the second support 102 may be installed on the installing object FL. Therefore, the hydrogen-containing water generating device 100 can be used in a different form according to a use environment.

It is favorable to install one having a larger area between the first support 101 and the second support 102 of the hydrogen-containing water generating device 100 to face the installing object FL. In doing so, the hydrogen-containing water generating device 100 can be stably installed.

(Mounting Structure of Hydrogen-Containing Water Generating Electrode)

Figure 32:
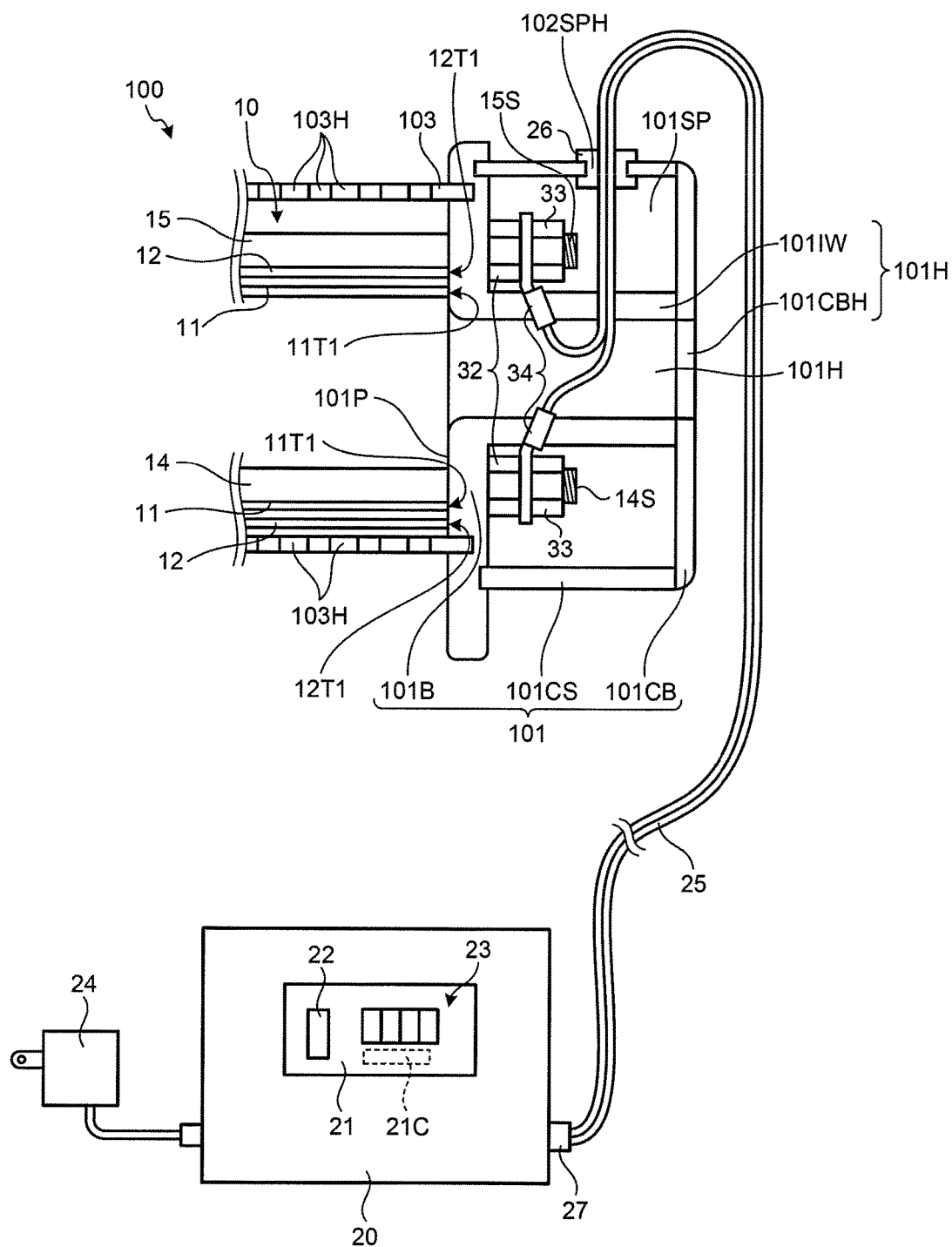
FIG. 32 is a diagram illustrating a mounting structure of when the hydrogen-containing water generating electrode is mounted to the hydrogen-containing water generating device according to the present embodiment.
Figure 33:
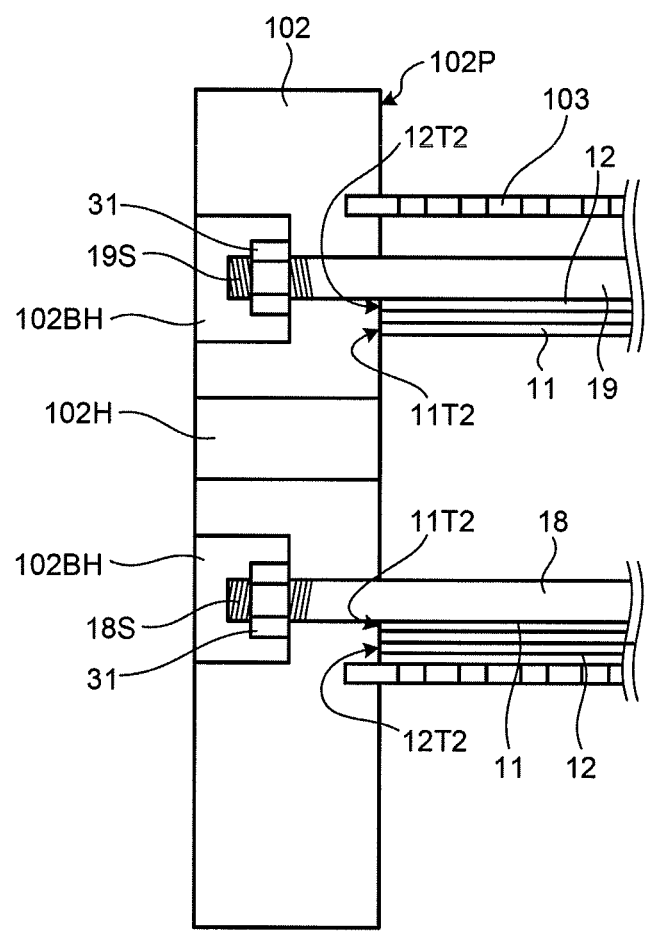
FIG. 33 is a diagram illustrating a mounting structure of when the hydrogen-containing water generating electrode is mounted to the hydrogen-containing water generating device according to the present embodiment.
Figure 34:
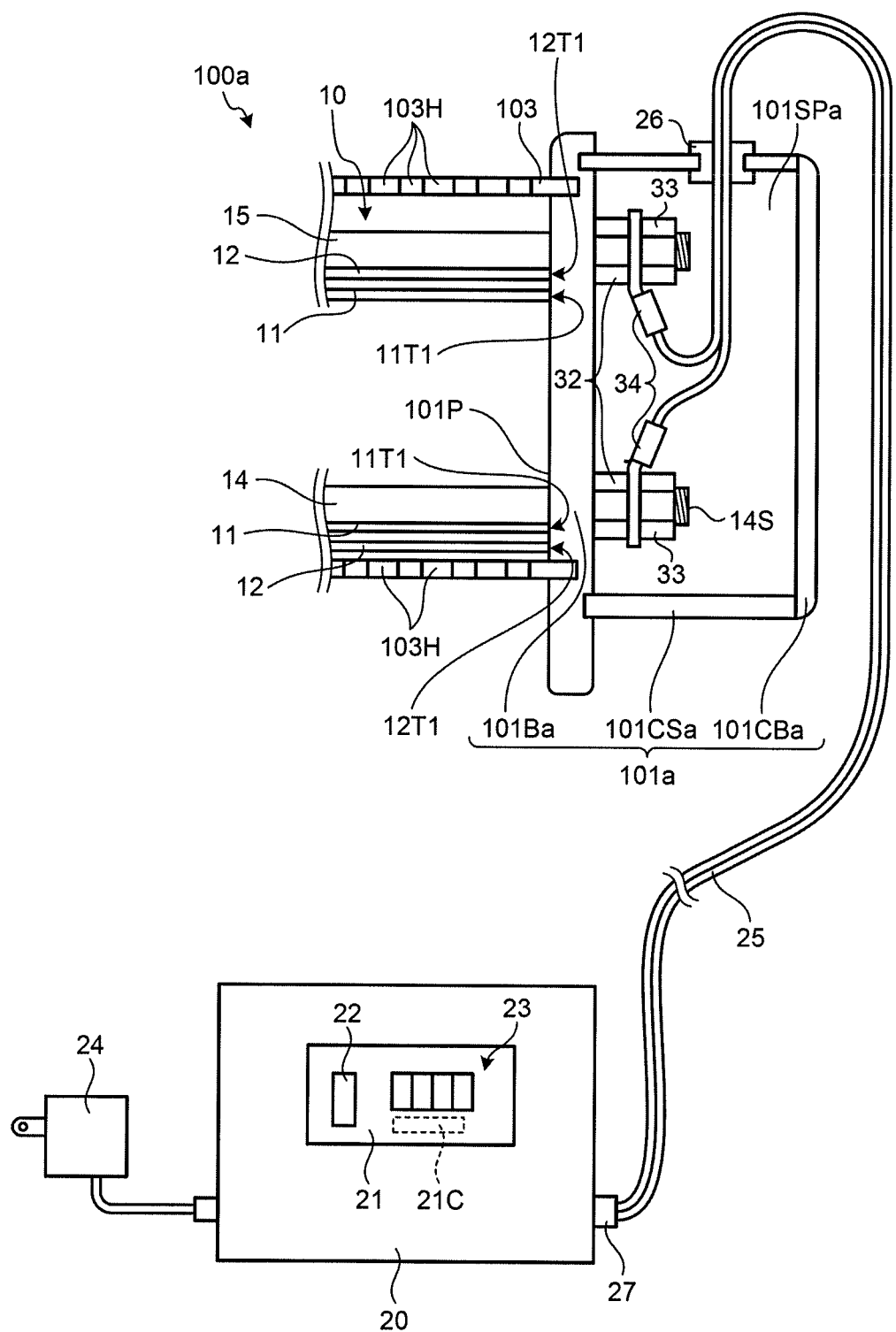
FIG. 34 is a diagram illustrating another mounting structure of when a hydrogen-containing water generating electrode is mounted to the hydrogen-containing water generating device according to the present embodiment.

FIGS. 32 and 33 are diagrams illustrating mounting structures of when the hydrogen-containing water generating electrode is mounted to the hydrogen-containing water generating device according to the present embodiment. FIG. 34 is a diagram illustrating another mounting structure of when the hydrogen-containing water generating electrode is mounted to the hydrogen-containing water generating device according to the present embodiment. FIGS. 32 and 33 illustrate a case in which the hydrogen-containing water generating device 100 is used being put in a bath. As illustrated in FIGS. 32 and 33, in the present embodiment, the hydrogen-containing water generating electrode 10 is supported by the first support 101 and the second support 102 with the positive-electrode power feed member 14 and the negative-electrode power feed member 15. By use of the positive-electrode power feed member 14, the negative-electrode power feed member 15, the positive-electrode support member 18, and the negative-electrode support member 19, the hydrogen-containing water generating electrode 10 can be mounted to the first support 101 and the second support 102 with a relatively simple structure.

As illustrated in FIG. 32, the positive-electrode power feed member 14 protruding from the first end portion 11T1 side of the positive electrode 11 and the negative-electrode power feed member 15 protruding from the first end portion 12T1 side of the negative electrode 12 are mounted to the first support 101. The first support 101 corresponds to the mounting object ST1 illustrated in FIG. 4. As illustrated in FIG. 33, the positive-electrode support member 18 protruding from the second end portion 11T2 side of the positive electrode 11 and the negative-electrode support member 19 protruding from the second end portion 12T2 side of the negative electrode 12 are mounted to the second support 102. The second support 102 corresponds to the mounting object ST2 illustrated in FIG. 4.

The first support 101 includes a mounting seat 101B, a tubular side-portion-side cover 101CS, and a plate-like cover 101CB. The mounting seat 101B supports the hydrogen-containing water generating electrode 10 and the protection member 103. The mounting seat 101B includes a tubular member (hereinafter, referred to as tubular member) 101IW at an opposite side to the hydrogen-containing water generating electrode 10. The tubular member 101IW extends toward a direction being away from the mounting seat 101B. An inside of the tubular member 101IW serves as a passage that connects the inside of the positive electrode 11 and the outside of the first support 101. The cover 101CB is mounted to an end portion of the side-portion-side cover 101CS and an end portion of the tubular member 101IW. The cover 101CB includes an opening 101CBH connected with the inside of the tubular member 101IW. The tubular member 101IW, to be specific, the inside of the tubular member 101IW and the opening 101CBH of the cover 101CB serve as the first opening portion 101H.

The mounting seat 101B is a member to which the positive-electrode power feed member 14 and the negative-electrode power feed member 15 are mounted, and supports the hydrogen-containing water generating electrode 10 through the positive-electrode power feed member 14 and the negative-electrode power feed member 15. The positive-electrode power feed member 14 and the negative-electrode power feed member 15 are mounted to and supported by the mounting seat 101B with bolts 32 respectively screwed into the male screws 14S and 15S, as illustrated in FIG. 32. The first end portions 11T1 and 12T1 of the positive electrode 11 and the negative electrode 12 are in contact with a mounting surface 101P that is one surface of the mounting seat 101B. The mounting seat 101B is held by the first end portions 11T1 and 12T1 of the positive electrode 11 and the negative electrode 12, and the bolts 32 and 32. With such a structure, the hydrogen-containing water generating electrode 10 is mounted to and supported by the mounting seat 101B through the positive-electrode power feed member 14 and the negative-electrode power feed member 15.

The first opening portion 101H included in the first support 101 faces the opening portions of the positive electrode 11 and the negative electrode 12, the opening portions being at the side of the first end portions 11T1 and 12T1. Therefore, the bubbles of oxygen in the positive electrode 11 pass through the first opening portion 101H, and are released to the outside of the hydrogen-containing water generating device 100.

The terminal 34 that connects the positive-electrode power feed member 14 and wiring 25, and the terminal 34 that connects the negative-electrode power feed member 15 and wiring 25 are arranged in a space (first-support-member inner space) 101SP surrounded by the mounting seat 101B, the cover 101CB, the side-portion-side cover 101CS, and the tubular member 101IW. The wiring 25 is pulled out to the outside from the first-support-member inner space 101SP through a grommet 26 provided in a hole 102SPH provided in the side-portion-side cover 101CS. The wiring 25 is electrically connected with the terminals 34 and 34. The grommet 26 lying between the wiring 25 and the side-portion-side cover 101CS of the first support 101 is a member that protects the wiring 25, and waterproofs the first-support-member inner space 101SP, and is made of, for example, rubber. A waterproof agent is filled in the first-support-member inner space 101SP. The positive-electrode power feed member 14, the negative-electrode power feed member 15, the terminal 34, and the wiring 25 are waterproofed with the waterproof agent.

As illustrated in FIG. 33, the positive-electrode support member 18 and the negative-electrode support member 19 are mounted to and supported by the second support 102 with the bolts 31 respectively screwed into the male screws 18S and 19S. The second end portions 11T2 and 12T2 of the positive electrode 11 and the negative electrode 12 are in contact with a mounting surface 102P that is one surface of the second support 102. The second support 102 is held by the second end portions 11T2 and 12T2 of the positive electrode 11 and the negative electrode 12, and the bolts 31 and 31. The bolts 31 are embedded in a spot facing hole 102BH provided in a surface at an opposite side to the mounting surface 102P of the second support 102. With such a structure, the hydrogen-containing water generating electrode 10 is mounted to and supported by the second support 102 through the positive-electrode support member 18 and the negative-electrode support member 19. Note that the second support 102 also supports the protection member 103, in addition to the first support 101.

As described above, both end portions of the hydrogen-containing water generating electrode 10 and the protection member 103 in the longitudinal direction are respectively supported by the first support 101 and the second support 102. The hydrogen-containing water generating device 100 reliably supports the hydrogen-containing water generating electrode 10 and the protection member 103 from both sides in the longitudinal direction, and can be of a firm structure.

A first support 101a included in a hydrogen-containing water generating device 100a illustrated in FIG. 34 includes a mounting seat 101Ba, a tubular side-portion-side cover 101CSa, and a plate-like cover 101CBa. The mounting seat 101Ba does not include the tubular member 101IW, which is included in the mounting seat 101B illustrated in FIG. 32. Therefore, the first support 101a does not include the first opening portion 101H, which is included in the first support 101 illustrated in FIG. 32. The positive-electrode power feed member 14, the negative-electrode power feed member 15, the terminals 34, and the wiring 25 are arranged in a first-support-member inner space 101SPa surrounded by the mounting seat 101Ba, the side-portion-side cover 101CSa, and the cover 101CBa. A waterproof agent is filled in the first-support-member inner space 101SPa. Other structures of the first support 101a, and a relationship with the hydrogen-containing water generating electrode 10 are similar to those of the first support 101 illustrated in FIG. 32. The second support 102 illustrated in FIG. 33 is applied to the hydrogen-containing water generating device 100a as it is.

The wiring 25 is connected with the power source 20 through a connector 27. The power source 20 is, for example, a secondary battery, and is a lead storage battery in the present embodiment. The power source 20 includes a control panel 21. The control panel 21 includes a control device (for example, a microcomputer) 21C, a power source switch 22, and a display device 23. The display device 23 is, for example, a single or a plurality of light-emitting diodes or a liquid crystal display panel. The power source 20 can be connected with an alternative current (AC) adaptor 24 for charging. When the power source switch 22 is turned ON, power is applied from the power source 20 to the hydrogen-containing water generating electrode 10, and the hydrogen-containing water generating electrode 10 performs electrolysis of the raw water W to generate the hydrogen-containing water. In the present embodiment, the control device 21C automatically stops the supply of the power when a predetermined time (for example, about 10 to 20 minutes) has passed from when the power source switch 22 is turned ON. In this way, when especially the hydrogen-containing water generating device 100 is put in a bath, and warm water containing hydrogen is generated, continuous supply of the power after the bathing is completed can be avoided. Therefore, the power consumption of the power source 20 can be suppressed.

The AC adaptor 24 converts an alternative current into a direct current to charge the power source 20. In the present embodiment, the hydrogen-containing water generating device 100 generates the hydrogen-containing water with the direct-current power supplied from the power source 20. However, for example, the hydrogen-containing water generating device 100 can generate the hydrogen-containing water with the direct-current power supplied from the AC adaptor 24. In this case, for example, the control device 21C switches the supply of the power to the hydrogen-containing water generating electrode 10 between the supply from the power source 20 and the supply from the AC adaptor 24.

The display device 23 displays timing to charge the power source 20, timing to wash or conduct maintenance of the hydrogen-containing water generating electrode 10, and the like. When it becomes the timing to charge the power source 20, a control device 20C blinks a charging notification lamp included in the display device 23, and when it becomes the timing for washing, the control device 20C blinks a washing notification lamp included in the display device 23. In doing so, a user of the hydrogen-containing water generating device 100 can recognize the timing of charging and washing.

When the connector 27 connected with the wiring 25 is pulled out of the power source 20 or when the hydrogen-containing water generating device 100 is pulled up from the raw water W, the control device 21C stops an output of the power from the power source 20, that is, causes the power source switch 22 to be in an OFF state. For example, when the current flowing in the hydrogen-containing water generating electrode 10 becomes a predetermined value or less, or 0, the control device 21C stops the output of the power from the power source 20. This is because, when the hydrogen-containing water generating electrode 10 is pulled up from the water, no raw water W exists between the positive electrode 11 and the negative electrode 12, and as a result, the current flowing in the hydrogen-containing water generating electrode 10 becomes the predetermined value or less, or 0. Further, this is because, when the connector 27 is pulled out of the power source 20, no current flows in the hydrogen-containing water generating electrode 10 through the wiring 25. The control device 21C can improve safety by controlling the output of the power of the power source 20.

In the present embodiment, the AC adaptor 24 is connected with the power source 20 to charge the power source 20. However, the charging of the power source 20 is not limited to such an embodiment. For example, the power source 20 may be charged by a non-contact charging system using electromagnetic induction. In doing so, waterproofing of the power source 20 and a charging device can be easily secured. Next, a modification of the hydrogen-containing water generating device 100 will be described.

(Modification)

Figure 35:
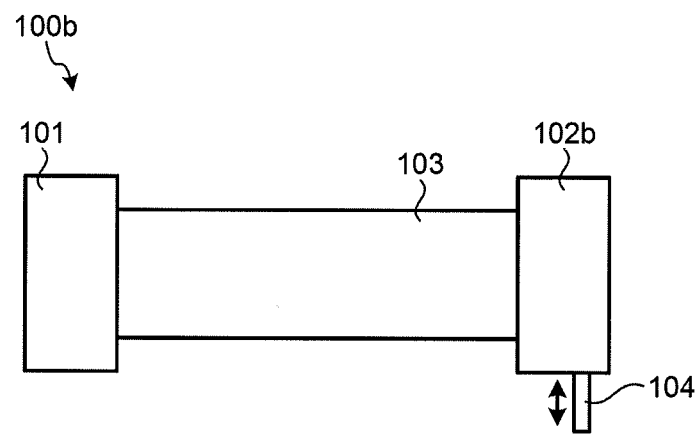
FIG. 35 is a diagram illustrating a modification of the hydrogen-containing water generating device according to the present embodiment.
Figure 36:
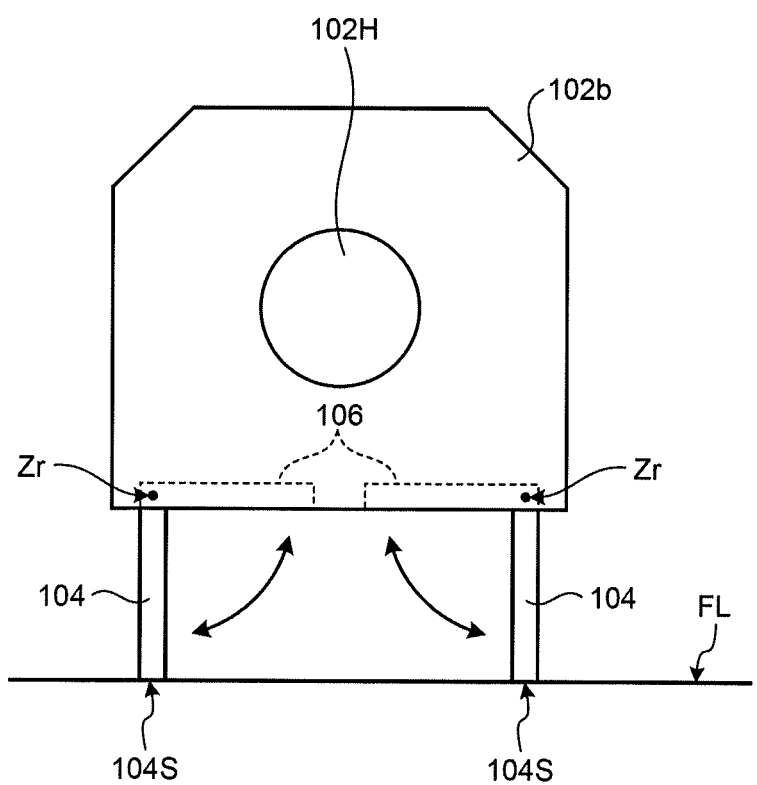
FIG. 36 is a diagram illustrating the modification of the hydrogen-containing water generating device according to the present embodiment.
Figure 37:
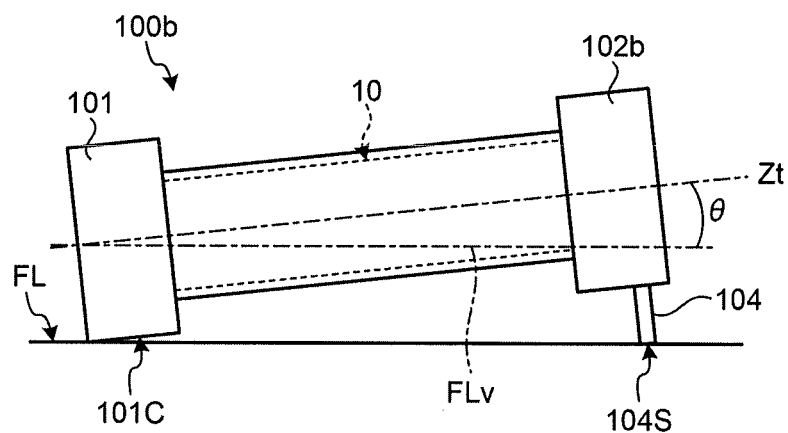
FIG. 37 is a diagram illustrating the modification of the hydrogen-containing water generating device according to the present embodiment.

FIGS. 35 to 37 are diagrams illustrating a modification of a hydrogen-containing water generating device according to the present embodiment. At the time of use of this hydrogen-containing water generating device 100b, foldable and storable legs 104 are taken out of a second support 102b, and are installed on an installing object FL. The leg 104 is, for example, a rod-like member rotating around a rotating shaft Zr provided at the installing object FL side of the second support 102b, as illustrated in FIG. 36. The leg 104 is provided to each of both sides of the second support 102b in a width direction. When the hydrogen-containing water generating device 100b is not used, the legs 104 are stored in storages 106 provided at the installing object FL side of the second support 102b. When the hydrogen-containing water generating device 100b is used, the legs 104 are taken out of the storages 106, and rotated around the rotating shaft Zr. Then, end portions 104S at an opposite side to the rotating shaft Zr come in contact with the installing object FL.

In doing so, the hydrogen-containing water generating device 100b is installed on the installing object FL with a first installation portion 101C of a first support 101, and the end portions 104S of the legs 104, as illustrated in FIG. 37. A second support 102b is more separated from the installing object FL with the legs 104, than the first support 101. Therefore, a hydrogen-containing water generating electrode 10 of the hydrogen-containing water generating device 100b is inclined with respect to a ground plane of the installing object FL such that, toward the second support 102b from the first support 101, the hydrogen-containing water generating electrode 10 is separated from the ground plane of the installing object FL. At this time, an angle formed by a central axis Zt of the hydrogen-containing water generating electrode 10, and the installing object FL (a virtual ground plane FLv in this example) is the above-described angle of inclination θ.

The hydrogen-containing water generating device 100b includes the storable legs 104 in the second support 102. Therefore, the second support 102b and the first support 101 can be of the same shape, and thus common components can be employed. Further, since the legs 104 are just taken out at the time of use, the second support 102 can be of an equal dimension to the first support 101. Therefore, the second support 102b can be made compact, and as a result, the hydrogen-containing water generating device 100b can be made compact.

As described above, the present embodiment has been described. However, the present embodiment is not limited by the above-described content. Further, the above-described configuration elements include those which can be conceived by a person skilled in the art, which are substantially the same, and so-called equivalents. Further, the above-described configuration elements can be appropriately combined. Further, various omissions, replacements, and changes of the configuration elements can be made without departing from the gist of the present embodiment.

REFERENCE SIGNS LIST 10, 10a, 10b, 10c, and 10d Hydrogen-containing water generating electrode 10R Curved surface portion
10T1 First end portion
10T2 Second end portion
10HA and 10HB End portion-side opening portion
11, 11c, and 11d Positive electrode
11H Opening
11S Side portion
11SL Slit
11Si Inside portion
11So Outside portion
11T1 and 12T1 First end portion
11T2 and 12T2 Second end portion
12, 12c, and 12d Negative electrode
12H Opening
12S Side portion
12SL Slit
12Si Inside portion
12So Outside portion
13, 13c, and 13d Insulator
13H Opening
14 Positive-electrode power feed member
15 Negative-electrode power feed member
20 Power source
21C Control device
22 Power source switch
23 Display device
24 AC adaptor
25 Wiring
27 Connector
34 Terminal
100, 100a, and 100b Hydrogen-containing water generating device
101 First support
101H First opening portion
101C First installation portion
102 Second support
102H Second opening portion
102C Second installation portion
103 Protection member
104 Leg
FL Installing object
W Raw water

The invention claimed is:

1. A hydrogen-containing water generating electrode comprising:
a positive electrode that is a tubular conductor and includes first openings in a side portion of the positive electrode, the positive electrode having a first end portion and a second end portion;
an insulator that is provided in direct contact with the positive electrode on an outer periphery of the positive electrode and that includes second openings; and
a negative electrode that is provided in direct contact with the insulator on an outer periphery of the insulator, the negative electrode being a tubular conductor in contact with the insulator and including third openings in a side portion of the negative electrode, the negative electrode having a first end portion and a second end portion;
a first support that is mounted to the first end portion of the positive electrode and the first end portion of the negative electrode;
a positive power feed member that is a rod-like conductor having:
a first end portion,
a second end portion, and a side portion mounted to a side portion of an inside of the positive electrode, the first end portion of the positive power feed member protruding outwardly further than the first end portion of the positive electrode;

a negative power feed member that is a rod-like conductor having:
 a first end portion,
 a second end portion, and
 a side portion mounted to a side portion of an outside of the negative electrode, the first end portion of the negative power feed member protruding outwardly further than the first end portion of the negative electrode; and a wiring that couples an external power source with the positive electrode through the positive power feed member and with the negative electrode through the negative power feed member, the first end of the positive power feed member and the first end of the negative power feed member being terminated within the first support that is filled with a waterproof agent, which waterproofs the positive power feed member, the negative power feed member and the wiring, wherein the insulator having the second openings is in direct contact with the positive electrode having the first openings, and is in direct contact with the negative electrode having the third openings, and the positive electrode and the negative electrode perform electrolysis of water using electronic power supplied from the external power source through the wiring.

2. The hydrogen-containing water generating electrode according to claim 1, wherein the positive electrode and the negative electrode include an end-portion-side opening portion as an opening portion in at least one of end portions.

3. The hydrogen-containing water generating electrode according to claim 1, wherein
 a size of a gap between the positive electrode and the negative electrode is from 0.1 to 1 mm, both inclusive.

4. The hydrogen-containing water generating electrode according to claim 1, wherein
 a size of a gap between the positive electrode and the negative electrode is equal to a thickness of the insulator.

5. The hydrogen-containing water generating electrode according to claim 1, wherein
 at least a part of the positive electrode and at least a part of the negative electrode have a curved surface.

6. The hydrogen-containing water generating electrode according to claim 5, wherein
 the positive electrode, the insulator, and the negative electrode have a cylindrical shape.

7. The hydrogen-containing water generating electrode according to claim 1, further comprising:
 a protection member that is a single tubular member outside the negative electrode and that includes a plurality of fourth openings, wherein
 the positive electrode and the positive power feed member define an innermost surface of the hydrogen-containing water generating electrode,
 the negative electrode and the negative power feed member is an outermost of the hydrogen-containing water generating electrode except the protection member, and
 a single insulator is disposed between the positive electrode defining the innermost surface and the protection member defining an outermost surface of the hydrogen-containing water generating electrode.

8. The hydrogen-containing water generating electrode according to claim 1, further comprising:
 a second support that is mounted to the second end portion of the positive electrode and the second end portion of the negative electrode,
 wherein, when a first installation portion of the first support and a second installation portion of the second support are in direct contact with an installing object of the hydrogen-containing water generating device, a distance that is from the side portion of the positive electrode to the second installation portion of the second support in a first direction perpendicular to the side portion of the positive electrode is greater than a distance that is from the side portion of the positive electrode to the first installation portion of the first support that is filled with the waterproof agent, in a first direction.

9. The hydrogen-containing water generating electrode according to claim 8, wherein
 the first installation portion is a side wall of the first support, and
 the second installation portion is a side wall of the second support.

* * * * *